United States Patent [19]

Krishnan

[11] Patent Number: 5,222,077
[45] Date of Patent: Jun. 22, 1993

[54] RADIX MAPPING WITH VARIABLE NUMBER OF SYMBOLS IN MAPPING PERIOD

[75] Inventor: Vedvalli G. Krishnan, Miami, Fla.

[73] Assignee: Racal-Datacom, Inc., Sunrise, Fla.

[21] Appl. No.: 965,120

[22] Filed: Oct. 22, 1992

Related U.S. Application Data

[63] Continuation of Ser. No. 683,359, Apr. 9, 1991, Pat. No. 5,185,763.

[51] Int. Cl.⁵ .............................................. H04L 5/12
[52] U.S. Cl. .................................... 375/39; 371/37.8; 371/43
[58] Field of Search ................. 375/38, 39; 371/37.8, 371/41, 43; 332/103; 329/304

[56] References Cited

U.S. PATENT DOCUMENTS

| | | | |
|---|---|---|---|
| 4,807,230 | 2/1989 | Srinivasagopalan et al. | 371/46 |
| 5,022,053 | 6/1991 | Chung et al. | 375/39 |
| 5,052,000 | 9/1991 | Wang et al. | 371/43 |
| 5,185,763 | 2/1993 | Krishnan | 375/39 |

*Primary Examiner*—Curtis Kuntz
*Assistant Examiner*—Young Tse
*Attorney, Agent, or Firm*—William A. Newton

[57] ABSTRACT

The present invention is directed toward a method and apparatus in a communications device for mapping a selected group of data bits into a predetermined number of two-dimensional symbols selected from a minimized alphabet of M two-dimensional symbols forming a symbol constellation, with one of the two-dimensional symbols being transmitter during each symbol (i.e., baud) interval. A plurality of symbol mappers in an adaptive communications device use a superframe of bits per baud. Each superframe includes at least two groups of frames, a low bit frame and a high bit frame. The superframe has A) one of these two types of frames uses whole bits per baud and the other uses fractional bits per baud or B) both of these two types of frames will use fractional bits per baud.

7 Claims, 16 Drawing Sheets

RADIX MAPPING WITH VARIABLE NUMBER OF SYMBOLS IN MAPPING PERIOD

CROSS REFERENCE TO RELATED APPLICATIONS

This is a continuation of pending U.S. patent application Ser. No. 7/683,359, filed Apr. 9, 1991, which is hereby incorporated by reference.

BACKGROUND OF THE INVENTION

1. Field of the Invention

This invention relates to a method and apparatus for mapping digital data to symbols in a symbol constellation with such symbols representing in the modulation of a carrier signal for transmission over a transmission medium.

2. Description of Prior Art

In data communications equipment (DCE), such as modems, the digital data from data terminal equipment (DTE) is inputted using the bit rate clock and mapped onto one of the members of an alphabet, such alphabet comprising one of M symbols (i.e., points) of a signal constellation. This mapping occurs at the symbol rate, and thereafter during each symbol interval, i.e., baud, the symbol is transmitted over a transmission medium. At a receiver in another DCE, the constellation symbol is recovered and the bit sequence representing the symbol is sent to another DTE.

The non-coded system of FIG. 1, is the simplest case of the above described DCE. K bits from the DTE are mapped on to $2^k=M$ symbols of a two dimensional symbol constellation by a symbol mapper 2 in the transmitter and transmitted over a baseband channel 4 to a receiver 6, wherein a slicer and decoder retrieves the K bits. This is a binary mapped system in that the number of symbols in the constellation, M, is a function of the base or radix 2 raised to the power of the whole number K, with K being the number of bits coded at a time during each baud. In other words, when using binary mapping to transmit K bits per baud, a symbol constellation of $2^k$ symbols is required and each of the K bit sequences is represented by one of the members (symbols) of this constellation, such constellation being a limited subset of all possible constellations. For example, with binary mapping, the number of points of a constellation, M, is always an even number and therefore all constellations having an odd number of symbols are excluded. As will be seen hereinafter, all the prior art schemes, in determining the number of symbols in a constellation, use this binary mapping concept.

As shown in FIG. 2, even in the more complicated multidimensional coding schemes, the same binary mapping process as described for the uncoded system is incorporated. Generally in these convolutionally encoded systems, some of the data bits from DTE are expanded by the convolutional encoder 8 and thereafter these coded bits select the sub-constellation (i.e., subset) to which the transmit symbol belongs. The rest of the data bits from blocks 10 and 12 are uncoded and are used to pick a symbol of the sub-constellation in the same way as mentioned above in the uncoded system. More specifically, one illustrative embodiment of a multidimensional coding scheme fitting the diagram of FIG. 2 is a 19.2K bps, eight dimensional, convolutionally encoded modem described in U.S. Pat. No. 4,761,784 which is incorporated by reference. In this modem, there is a group time interval extending over four bauds and includes a frame of 28 data bits. These 28 bits per frame, after being expanded to 29 bits, are allocated over the four bauds to create fractional bits per baud as follows ("x" indicates bits):

| Uncoded Bits | | | | Coded Bits | | | |
|---|---|---|---|---|---|---|---|
| 21 bits(5.25 bits/baud) uncoded bit to constellation symbol index (5.25 bits/baud) | | | | 7 bits(1.75 bits/baud) coder (+1) (2 bits/baud) | | | |
| 1 | 2 | 3 | 4 | 1 | 2 | 3 | 4 |
| 0   xxxxx | xxxxx | xxxxx | xxxxx | xx | xx | xx | xx |
| 1 00  xxx | xxxxx | xxxxx | xxxxx | xx | xx | xx | xx |
| 1 01 xxxxx | xxx | xxxxx | xxxxx | xx | xx | xx | xx |
| 1 10 xxxxx | xxxxx | xxx | xxxxx | xx | xx | xx | xx |
| 1 11 xxxxx | xxxxx | xxxxx | xxx | xx | xx | xx | xx |

As described in more detail in the above referenced patent, each baud two coded bits from the convolutional encoder 8 ("coder") and either five or three uncoded bits from an index generator 10 are selected to look up the transmit symbol in a look-up table. Together these coded and uncoded bits access the 160 symbol $(2^7+2^5)$ constellation, which is subdivided into sub-constellations, i.e, subsets. Each sub-constellation contains 40 symbols ($2^5$ inner symbols + $2^3$ outer symbols). More specifically, 21 bits of each four baud frame of 28 bits are uncoded. By way of the fraction mapper 12, one uncoded bit specifies whether there is an outer symbol (otherwise, as shown in row 1, these are all inner symbols) as indicated in column 1 in the above chart. If there is an outer symbol, column 2 indicates in which of the four bauds it occurs. The next four columns (specified by the bauds 1 through 4 in the chart) show the remaining uncoded bits (three bits or five bits) spread over the four bauds, with five uncoded bits being required to specify an inner symbol and three uncoded bits required to specify an outer symbol. Since this implementation requires fractional uncoded bits per baud (5.25 bits per baud), the above described technique of switching between inner and outer symbols allows for a whole number of uncoded bits per baud to specify a given symbol in either the inner or outer signal constellation. However, both the inner and outer signal constellations use binary mapping, i.e., the number of points is a function of radix 2 raised by some whole number power, e.g., to the power of five or three depending upon whether it is an inner or outer point, respectively. In FIG. 2, the diagram is also shown to be generic to those systems that also have "middle points". Symbol mappers 14 and 16 are shown merely to illustrate the fact that there is a new symbol mapper for each of the four baud intervals in the illustrative eight dimensional convolutionally encoded system. This kind of known binary mapping, as presented in this example, will be referred to as "fractional bit binary mapping.

An alternative type of well known binary mapping that could have been used in the above 19.2K modem example will be referred to as "whole bit binary mapping". With this scheme, any fraction is expressed by the existence or absence of whole bits. For example, a ¼ fraction is equivalent to 1, 0, 0, 0, where out of every fourth frame one frame uses one more bit per baud (thereby doubling the constellation) over the other three frames. In the above 19.2k example, seven bits can be transferred in each of three bauds and eight bits could be transferred in one baud.

As a further example of the exclusive use of binary mapping in a two dimensional convolutionally encoded system, the CCITT V.32 Standard specifies the transmission of an integer number of bits per baud, i.e., 5 bits per baud, with four data bits per baud being expanded by two dimensional convolutional encoding to the 5 bits per baud as shown in the following chart ("X" indicates bits):

| Uncoded Bits | Coded Bits |
| --- | --- |
| 2 bits/baud | 2 bits/baud |
| uncoded bit to constellation symbol index | coder (+1 bit) |
| 2 bits/baud) | (3 bits/baud) |
| xx | xxx |

In this modem during each baud, three coded bits from the convolution encoded ("coder") and two uncoded bits are used to access a $2^5=32$ symbols constellation for generating transmit symbol Note that unlike the previous eight dimensional, 19.2K bps example, there are no fractional bits per baud, but again, binary mapping is used, i.e., $2^5$ symbols exist in the constellation.

The use of an 8-dimensional or 4-dimensional convolutionally encoded system instead of a 2-dimensional convolutionally encoded system allows for a reduction in the number of additional symbols required for the redundancy coding; however, in all three cases binary mapping is used.

In FIG. 3 a block coder system is shown having a block coder 18, with n bits being allocated between the uncoded bits 20 and the fractional mapper 22 and, with there being a different symbol mapper (illustrated by mappers 24 and 26) for each baud of the group interval over which mapping occurs. Again, as can been seen, binary mapping is used.

Four illustrative examples of various uncoded and coded systems were shown above to illustrate the use of binary mapping in prior art schemes. However, binary mapping has a number of deficiencies as will be described below. First, there is a loss in bit mapping efficiency for systems utilizing fractional bit rates, such as illustrated by the 19.2K system of FIG. 2, as compared whole integer bit rate systems, such as the CCITT V.32 system described above. In the CCITT V.32 system all 32 symbols are equi-probable and a 32 symbol set can represent only 5 bits. So, it is 100% efficient. In the 19.2K system, the 160 symbols are not equi-probable, so part of the fractional bits are lost. A 160 symbol constellation can represent 7.322 bits per baud, yet in 19.2K system described above, due to the binary mapping, it is used to represent only 7.25 bits per baud. This is only 99% efficient. A binary mapped six symbol constellation is only 96.5% efficient, etc.

Secondly, as previously explained, a binary mapped system does not have the ability to generate a map for any constellation. Obviously, any constellation containing odd number of symbols cannot be represented by a binary mapping technique. This limits the data rate adaptability to the channel and a DCE's capacity to provide incremental data rates to the customer. For example, the binary mapping cannot represent a three symbol constellation, so the data rate of such a system has to be brought down to map into a two symbol constellation, which is only 63% efficient.

Thirdly, as already explained, one problem with the fractional bit binary mapping used in the above described 19.2k system is that, due to the inner and outer symbol constellations, the symbols are not equally probable, i.e., the system is not deterministic. Hence, problems are created when Tomlinson precoding is incorporated into such a system.

SUMMARY OF THE INVENTION

The present invention is directed toward a method and apparatus in a communications device for mapping a selected group of data bits into a predetermined number of two-dimensional symbols selected from a minimized alphabet of M two-dimensional symbols forming a symbol constellation, with one of the two-dimensional symbols being transmitter during each symbol (i.e., baud) interval, where the term M is variable.

A data-bit-to-symbol mapper receives a predetermined number of data bits, $R \times p$, in p baud intervals. For a mapping period consisting of p baud intervals, the symbol mapper selects from an alphabet of M symbols, where M is defined according to the following equation:

$$U = \prod_{c=1}^{p} M_c \geq Q = 2^{R \cdot p}$$

wherein said term Q is the number of unique groups of $R \times p$ data bits, said term U is the number of unique combinations of said selected symbols, and the term R, the average number of data bits per baud, is a non-integer number greater than one. The data bits are grouped over the mapping period of p bauds such that:

$$R \times p = \text{integer number}$$

Over the mapping period, a 2p-dimensional symbol is selected from a plurality of 2p-dimensional symbols for transmission, the plurality of 2p-dimensional symbols being equal to the number U.

For certain desired data bit rate (bits per second) and baud rate (bauds per second) combinations ("data and baud rates combinations"), this "non-binary mapping" allows for constellations with fewer symbols than that provided by the previously described, prior art, "binary mapping" technique. For example, constellations with an odd number M of symbols are possible with the non-binary mapping technique according to the present invention. Prior to the present invention, "multidimensional" mapping over a plurality of baud intervals had never been undertaken for the purpose of allowing constellations based on non-binary mapping. The value of number of symbols M may vary over the mapping period.

BRIEF DESCRIPTION OF THE DRAWINGS

Further objects and advantages of the present invention will become apparent as the following description proceeds taken in conjunction with the accompanying drawings in which:

FIGS. 8F and 8G provide a symbol constellation used with one implementation of the present invention wherein FIG. 8F provides one half of the constellation and FIGURE 8G provides the other half of the constellation.

DETAILED DESCRIPTION OF PREFERRED EMBODIMENT

Figure 4:
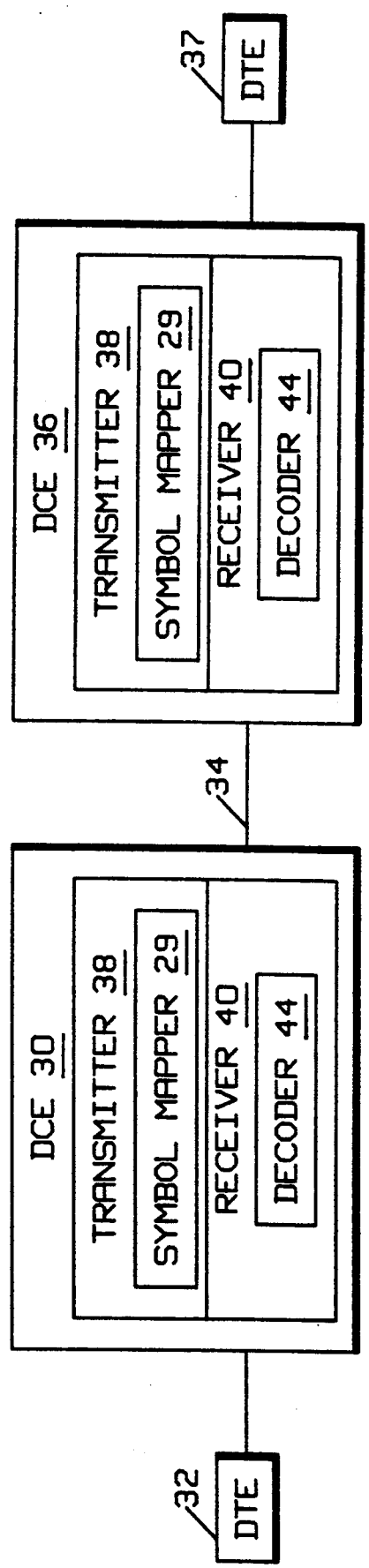
FIG. 4 is a generalized block diagram of a data communication system in which the present invention is implemented.

To better understand the hereinafter-described embodiments of the data-bits-to-symbol mapper 29 of the present invention, a general overview of the environment in which such embodiments are implemented is provided in FIG. 4. Referring to FIG. 4, a first communications device, generally referred to as data communications equipment ("DCE") 30, receives digital binary data from a first data terminal equipment ("DTE") 32. The DCE 30 may comprise, for example, a modem or a high speed digital subscriber loop (HDSL). The DTE 32 may comprise a data source, such as, for example a personal computer or mainframe computer. The DCE 30 is connected via a transmission medium 34, typically a bandlimited channel, to a second DCE 36, which in turn is connected to a second DTE 37. In a conventional manner, the DCE's 30 and 36 provide the functions required to establish, maintain and terminate a connection, signal conversion and mapping, and coding, if any, required for communications between the DTE's 32 and 37. The DCE's 30 and 36 may or may not be an integral part of the DTE's, e.g., a modem comprising a printed circuit board in a personal computer. Each DCE 30 or 36 includes a transmitter 38 for transmitting a modulated carrier signal containing data over the transmission medium 34 and a receiver 40 for receiving a modulated carrier signal containing data over the transmission medium 34 and may, for example, either operate in a half duplex or full duplex mode. The DCE's 30 and 36, at each end of the transmission medium 34, preferably, but not necessarily, have the same transmitter and receiver structures and functionality, i.e., each DCE 30 or 36 may transmit as well as receive.

In a conventional manner, the data from the DTE 32 is supplied to the DCE 30 typically using a bit rate clock provided by the DTE 32. The transmitter 38 of the DCE 30 includes at least one data-bits-to-symbol mapper 29 ("symbol mapper"), which is used to map, at the symbol rate (i.e., baud rate), a sequence of data bits to one of M symbols (points) in a two dimensional symbol constellation. The symbols of a two dimensional signal constellation represent, in the complex plane, the possible modulations of a carrier wave signal created by modifying its amplitudes and/or phase so as to give a modulated carrier signal for transmission over the transmission medium 34. Depending upon the implementation, the symbol mapper 29 may include a number of conventional transmitter components, such as a scrambler, differential encoder, symbol generator and, in systems using coding, a convolutional or block coder. When greater than two dimensional convolutional encoding is implemented, the symbol mapper 29 maps over more than one baud (i.e., symbol interval), e.g., in eight dimensional convolutional coding the symbol mapper 29 would map the data over four two-dimensional symbol constellations occurring in four consecutive baud periods. Thereafter, the transmitter 38 typically includes a modulator and bandpass filters so that the selected symbol modulates the carrier wave each baud. The modulated carrier wave is thereafter transmitted over the transmission medium 34.

To the extent described above, the DCEs 30 and 36 are of conventional design. A first generalized embodiment of the present invention is directed toward the symbol mapper 29 which is a data-bit-to-M symbol converter, wherein M, the number of symbols in the two dimensional signal constellation, is preferably the smallest number of symbols needed to transmit the described number of data bits per baud so as to achieve a desired error rate. In the prior art, the selection of the alphabet M was constrained to be defined by the following exponential equation:

$$M = 2^k$$

where M, the number of symbols in the constellation, is equal to the base (radix) of 2 raised to the power of K, a positive, whole integer number that is the number of bits per baud.

In the generalized first embodiment of the present invention, the symbol mapper 29 receives R×p data bits in p baud intervals. For each baud interval of a mapping period of p bauds, the symbol mapper selects from an alphabet of M symbols, where M is selected according to the following equation:

$$M \geq 2^R$$

and where M is the nearest integer number to the base 2 raised to the power of R and where R is a positive, non-integer number greater than one and is the number of bits per baud. Consequently, for a given desired data bits per baud, $M \geq 2^R$ is used according to the invention instead of $M = 2^K$ where the prior one leads a constellation having less symbols than the later one. This mapping scheme of the present invention shall be referred to as "non-binary mapping".

The non-binary mapping of the present invention requires that the symbol mapper 29, over the preselected mapping period of p baud intervals, group the received data bits so that within the mapping period there are R×p data bits, where R×p=integer number. In this manner, when M is constant over the mapping period, $M^p \geq 2^{R \times p}$. Using this received data, the symbol mapper selects p 2-dimensional symbols, and thereby selects a 2p-dimensional symbol selected from $M^p$ 2p-dimensional symbols for transmission. In one implementation, in each of the p bauds, i.e., baud intervals of the mapping period, the constellation (and therefore the number of symbols M) remains constant. However, as will be mathematically described hereinafter, it is within the scope of the present invention to vary the number of symbols M over the mapping period. The symbol mapper 29 selects one of these symbols each baud interval from constellations differing in their number of symbols M. The p selected symbols define one 2p-dimensional symbol, i.e., p two-dimensional symbols. This "multidimensional" mapping over a plurality of bauds allows for "non-binary symbol constellations", i.e., constellations not having $2^K$ symbols, but having $2^R$ symbols.

For the purposes of this document, the term "integer(s)" is considered to include not only numbers which will fall under the strict mathematical definition of "integer(s)" (e.g., 1,2,3 . . . ), but also is considered to include decimal equivalents of integers (e.g., 1.0, 2.0, 3.0 . . . ). Similarly, the result of mathematical operations using integers will be considered to be the results obtained when real numbers are substituted in the operation (e.g. $\frac{3}{4} = 3.0/4.0 = 0.75$.).

The methodology of the non-binary mapping allows for the calculation of M when the desired bits per baud "R" are known in the following manner.

$$N = 2^R$$

where R is the non-integer desired bits per baud and N is the calculated number of symbols in the constellation and in most cases will be a non-integer number. However, it is not possible to have a non-integer number of symbols in a two-dimensional symbol constellation; hence, the non-integer N is rounded of to the nearest integer M, where M (which is the previously defined integer M), is greater than N, when N is a non-integer. Due to the rounding off process, when the calculated M is used to recalculate R, the following holds true:

$$M = 2^R$$

This recalculated R, the maximum data bits per baud, is, in this example, higher than the desired data bits per baud, due to the rounding off process. In other words, the actual recalculated R may be higher than the desired R bits per baud, i.e., that which is used in the actual implementation. Because of the need to have a whole number of symbols M, some small bits per baud capacity may be thrown away in the actual implementation where the number of bits per baud are predetermined and do not lead to the calculation of a whole number of symbols. If M is selected first, then the method according to the present invention allows for the calculation of an "R", which is the "maximum bits per baud".

In general a constellation sequence is selected such that:

$$\prod_{c=1}^{p} M_c \geq Q = 2^{R \cdot p}$$

where R is a non-integer and R*p=integer. In this document the symbol "*" is used to indicate multiplication. The above equation takes into account the implementation where the number of symbols M is allowed to vary over the mapping period p. This varying M, may, for example, allow the previously described desired R and recalculated R to more closely approach each other.

The receiver 40 of the DCEs 30 or 36 recovers the transmitted constellation symbol. The receiver 40 has a decoder 44 for decoding the symbols and for converting such symbols to the data bits, which are outputted to the DTE 37. Such DCEs 30 and 36 may, but not necessarily, include secondary channel utilizing constellation multiplexing as described in U.S. Pat. No. 4,891,806, which is incorporated by reference herein.

Figure 5:
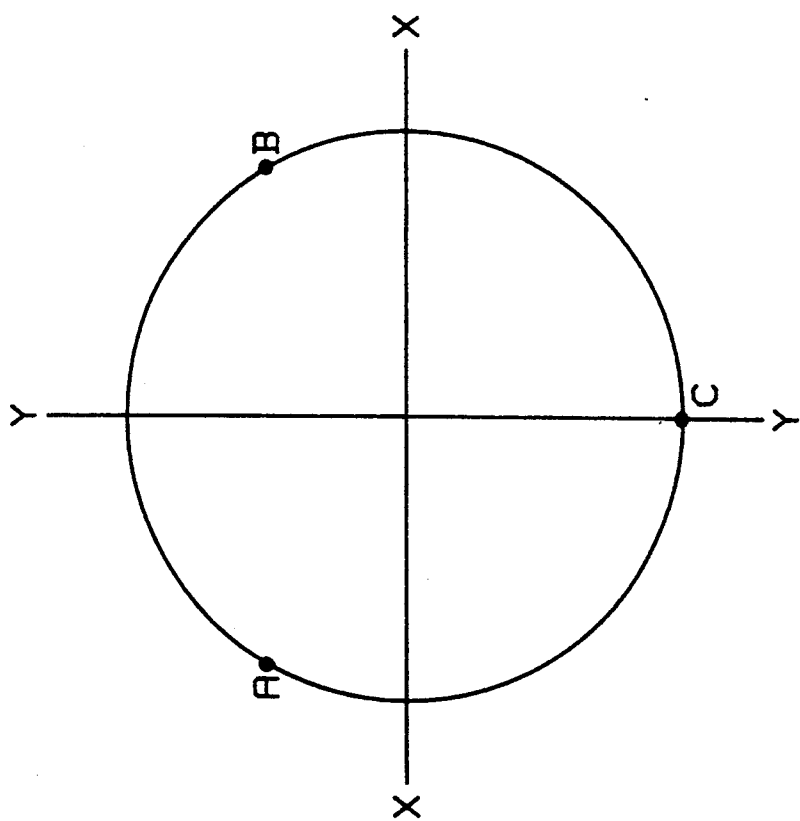
FIG. 5 shows a three symbol constellation in the complex plane used in one embodiment of the non-binary mapping of the present invention.

In a specific implementation of the first embodiment the symbol mapper 29 of the present invention shown in FIG. 4, the DCEs 30 and 36 comprise low speed modems wherein the symbol mapper 29 provides 1.5 bits per baud rate (R) by mapping over a two baud period (p) using three (M) symbol constellations shown in FIG. 5.

Referring to FIG. 5, there is shown a conventional two dimensional signal constellation having three equal amplitude symbols, which are phase encoded and separated by 120 degree phase shifts. In each baud one of the three symbols A, B and C is transmitted. The mapper 29 maps over a mapping period of two baud interval, such mapping being shown as follows:

| Binary bit sequence base-2 | constellation sequence base-3 or base-$2^{1.585}$ | transmitted symbols |
| --- | --- | --- |
| 000 | 00 | A, A |
| 001 | 01 | A, B |
| 010 | 02 | A, C |
| 011 | 10 | B, A |
| 100 | 11 | B, B |
| 101 | 12 | B, C |
| 110 | 20 | C, A |
| 111 | 21 | C, B |
|  | 22 | (C,C not transmitted) |

First, each of the binary bit sequence shown in the leftmost column in the above chart includes "a" bits of data, (where a=3), from the DTE 30 or DTE 36. The three data bits selected at the time create eight possibilities, i.e., $2^3 = 8$. Based upon using a mapping period of two bauds, selection of one of the three symbols A, B, and C during each of two consecutive bauds creates nine possibilities ($M^p$) as shown by the base 3 (i.e., base $2^{1.585}$) constellation sequence in tertiary digits shown in the middle column of the chart. The maximum data rate that could be supported by three symbols is given by log 3=1.585. So M=3 can provide the desired 1.5 bits per baud.

In the rightmost column, the actual symbols selected are shown, with the first symbol being transmitted in the first baud and the second symbol being transmitted in the second baud of each two baud mapping period. In a conventional manner, the absence of constellation sequence 22 (symbols C,C) is used in the receiver 40 to maintain the synchronization in the non-binary bit converter. The symbol C,C could also be used for a secondary channel.

Although M is shown to remain constant over the mapping period of p bauds, and added advantage of the present invention is that M may vary in value from baud to baud within the mapping period.

With the non-binary mapping according to the present invention, there is a delay versus efficiency trade off. For example, in the above system, if a mapping period of twelve bauds is used, there is introduced a twelve baud delay (instead of the two baud delay described above). If this twelve baud delay is acceptable in the transmitter 38 and in the receiver 40 (total 24 bauds), then by mapping over a twelve baud period, nineteen binary bits could be encoded into 12 tertiary digits (symbols) increasing the bit packing efficiency by 1/18=5.55% and the bit rate increases from 1.5 to 1.583 bits/baud. In other words, a 24 (2p, p=12) dimensional symbol is used instead of a 4 (2p, p=2) dimensional symbol. In general, the longer the data bits accumulation is done before the non-binary mapping conversion, the better the bit packing capacity is, though most of the gain could be achieved with an acceptable amount of delay.

With the non-binary mapping of the present invention, the euclidian distance in the constellation is maximized with minimum constellation expansion and better performance is achieved than the fractional bit or whole bit binary mapping schemes previously discussed.

An important distinction between the binary mapping of the prior art and non-binary mapping of the present invention is as follows. If the data transmission medium 34 cannot support, for example, a 2 bit per baud rate (4 symbol constellation), then in a binary mapping system, the only choice is to fall back to 1 bit per baud rate (2 symbol map) at a loss of 50% data rate. If the non-binary mapping technique of the present invention is used, it is possible to transmit up to 1.585 bits per baud using a three symbol map at a loss of only 20.75%. It is contemplated that this non-binary mapping at these low data rates may create a significant advantage in the now developing high speed DSL area.

With respect to FIG. 6, a second generalized embodiment of the present invention shall be described, which comprises an "adaptive" DCE 30 or 36. A plurality of symbol mappers 42 are implemented in the "adaptive" DCE 30 and DCE 36. In an adaptive DCE 30 or 36, the DCE 30 or 36 adapts to different data rates (bits per second) by adjusting the baud rate (symbol rate), the number of data bits per baud and bandwidth (which is determined by the baud rate), based upon the conditions of the transmission medium 34 as determined by conventional line probing. In the adaptive DCE 30 or 36, the maximum number of bits per baud is determined by the minimum number of symbols M in a constellation that is necessary to achieve a desired level of performance, i.e., a desired error rate.

In this second generalized embodiment of the present invention, the alphabet M is defined as follows:

$$M \geq 2^S$$

where S=R or K, and in the case of S=R, M is the nearest integer number to $2^R$. The power S is the bits per baud and may be the whole integer K or the non-integer fraction R, depending upon which one has the lowest number of symbols for the desired number of data bits/baud. This mapping includes the binary mapping of the prior art (S = K) or the non-binary mapping of the present invention (S = R). Hereinafter, this mapping is referred to as "radix mapping" in that for each data bit per baud rate, the constellation with the minimum number of symbols is selected, such constellation either being the based upon non-binary or binary mapping technique. The adaptive DCE 30, and therefore radix mapping, includes a plurality of symbol mappers 42 (one for each desired data and baud rates combination), some utilizing non-binary mapping and some utilizing binary mapping, as these terms have been defined herein. As already mentioned, M may vary over the mapping period when non-binary mapping is used.

In this second generalized embodiment, using conventional techniques, the transmission medium 34 may be probed to determine the best baud rate, carrier frequency and bits per baud. When the condition of the transmission medium 34 deteriorates, and a reduced bits per baud is called for, the DCEs 30 or 36 reduces the number of symbols per baud (selects a new symbol constellation with a reduced number of symbols M) by the minimum amount needed to achieve the desired error rate, thus maximizing the customer data rate. However, the present invention, and therefore the term "adaptive modem", is not limited to the known automatic adaptive nature of the adaptive modem 30. To the contrary, the DCEs 30 and 36 may be manually set by users to one of the data rates/baud rates modes of operation in a manner well known in the prior art.

The use of radix mapping according to the present invention has the advantage of creating finer "granularity" of bits per baud rate adaption. Likewise, when a secondary channel using the previously described constellation multiplexing for network management or security is needed, the number of constellation symbols M (and therefore the bits per baud) may be incremented by a minimum amount needed to support the added data rate required by the secondary channel.

In this second embodiment, M (number of symbols in the constellation) is selected to equal the smallest number of symbols needed to transmit the desired number of data bits per baud or having a desired M a maximum bits per baud rate may be determined. More specifically, the unrestrained use of any number of symbols M in a constellation permits the following methodology having the following steps:

1. Given the desired data bits per baud rate of transmission, the minimum symbol constellation is selected by the DCE 30 and 36 that would be needed to transmit the number of bits per baud. In this way, the euclidian distance in the constellation is maximized and better performance may be realized.
2. Given a well packed optimum constellation having a preselected M symbols, the maximum bits per baud that may be supported may be calculated and the bandwidth adjusted to obtain the desired data rate (bits per second).
3. When a channel deteriorates, the constellation symbols M may be reduced by the minimum or minimal amount needed to achieve the desired error rate, thus maximizing customer data rate.
4. When a secondary channel for security or management is needed, the M constellation symbols may be incremented by minimum or minimal amount needed to support that extra rate.

In some cases, it may be desirable in the above described situations to decrease or increase M by an amount less than the theoretical maximum, as well be obvious to those skilled in the art. For example, as previously discussed, efficiency is a function of delay and complexity in some cases. The longer binary bits accumulation (the greater the value of p of the mapping period) is done before data conversion to symbols, the better the bit packing capacity is, though most of the gain could be achieved with acceptable amount of delay.

As will be described in the specific implementation of the second embodiment of the present invention to be provided hereinafter, the radix mapper 42 synchronization must be maintained and radix mapper 42 computer programs are needed in both the transmitter 38 and the receiver 40.

As further disclosed in FIGS. 6 through 12, a specific implementation of the generalized adaptive DCE 30 or 36 is provided. This specific implementation of each of the DCEs 30 and 36 of FIG. 4 comprises a pair of "adaptive" modems 30 and 36 of FIG. 6. As shown by TABLES 1 and 2 below, these adaptive modems 30 and 36 each have preferably, but not necessarily, eleven different data rates starting at 4,800 b.p.s bits per second (b.p.s.) to 25,200 b.p.s. steps. There are four baud (symbol) rates comprising 2400, 2743, 2954, and 3200 bauds per second and five carrier frequencies comprising 1600, 1670, 1745, 1829, and 1920. As will be apparent to those skilled in the art, there are numerous possible combinations of data and baud rates, more or less in number, than presented herein, that can be used in an adaptive modem with the present invention, and the current combinations are merely illustrative.

The following definitions and preliminary explanations will assist in understanding the disclosure provided hereinafter. For the purpose of defining this invention, each combination of data rates and baud rates defines a "mode of operation" of the adaptive modem. For a given mode of operation, there is defined an average bits per baud (bits/baud) over a superframe. This superframe includes a plurality of frames of bits per baud that is described in detail hereinafter. The average bits per baud is used with respect to this superframe as follows:

*Data rate (b.p.s.) = average bits/baud x bauds/sec*

The term "average bits per baud", which will be used in conjunction with various multiple baud periods other than that of the above mentioned superframe, is the average of the bits per baud over the applicable multiple baud period. Within these multiple baud periods, the bits per baud frequently differ from baud to baud, as will be described hereinafter. For the purposes of describing the present invention, each of the superframe having a different average bits per baud will be considered to be generated by a separate "modulation scheme", and a separate symbol mapper 42 is defined for each of these modulation schemes, as shown by the plurality of symbol mappers 42 shown in FIG. 6. As shown in Table 1, different modes of operation (data and baud rates combinations) sometimes use the same "modulation scheme", e.g., the 16,800 b.p.s./2400 bauds and 19,200 b.p.s./2743 bauds modes of operations use the same modulation scheme, i.e., same average bits per baud and same symbol constellations, and differ only in their baud rates. Baud rate differences do not affect the structure of the symbol mappers 42. As will be seen hereinafter, the inclusion or exclusion of a secondary channel results in a different modulation scheme. As will become apparent from the hereinafter described "superframes", each modulation scheme (and therefore each symbol mapper 42) may make use of a plurality of symbol constellations, i.e., bits per baud rates. However, the scope of the definition for symbol mappers 42, as used herein, is merely a matter of choice. For the sake of simplicity, only three symbol mappers 47, 48 and 49 are shown in FIG. 6, i.e., for 4,800 b.p.s. at 2,400 bauds per second, 19,200 b.p.s. at 2,743 bauds per second, and 25,200 b.p.s. at 3,200 b.p.s. However, it should be understood that the present invention only involves that portion of the mappers 42 that generates fractional bits per baud. For example, even in coded systems, only the uncoded bits are affected and that portion generating the coded bits is not effected.

The various combinations of baud rates and data rates with a secondary channel (to be described hereinafter) are shown in the first two columns of the following TABLE 1:

TABLE 1

| Data Rate (B/S) | Baud Rates (Hz) | M For WBBM With SC | M For FBBM With SC | SUPERFRAME | | | |
|---|---|---|---|---|---|---|---|
| | | | | X | Bits/baud | Y | Bits/baud |
| 4800 | 2400* | 4/8 | | 55 | 2 | 8 | 2.25 |
| 7200 | 2400 | 8/16 | | 51 | 3.25 | 12 | 3.5 |
| | 2743 | 4/8 | | 21 | 2.75 | 42 | 3 |
| 9600 | 2400 | 16/32 | | 47 | 4.25 | 16 | 4.5 |
| | 2743 | 8/16 | | 49 | 3.75 | 14 | 4 |
| 12000 | 2400 | 32/64 | | 43 | 5.25 | 20 | 5.5 |
| | 2743 | 16/32 | | 14 | 4.5 | 49 | 4.75 |
| | 2954 | 16/32 | | 31 | 4.25 | 32 | 4.5 |
| 14400 | 2400 | 64/128 | 80/96 | 39 | 6.25 | 24 | 6.5 |
| | 2743 | 32/64 | | 42 | 5.5 | 21 | 5.75 |
| | 2954 | 32/64 | | 12 | 5 | 51 | 5.25 |
| 116800 | 2400 | 128/256 | 160/192 | 35 | 7.25 | 28 | 7.5 |
| | 2743 | 64/128 | 80/96 | 7 | 6.25 | 56 | 6.5 |
| | 2954 | 32/64 | | 56 | 6 | 7 | 5.25 |
| | 3200 | 32/64 | | 42 | 5.5 | 21 | 5.75 |
| 19200 | 2743 | 128/256 | 160/192 | 35 | 7.25 | 28 | 7.5 |
| | 2954 | 64/128 | 120/128 | 37 | 6.75 | 26 | 7 |
| | 3200 | 64/128 | 80/96 | 39 | 6.25 | 24 | 6.5 |
| 21600 | 2743* | 128/256 | 240/256 | 0 | 7.75 | 63 | 8 |
| | 2954 | 128/256 | 192/240 | 18 | 7.5 | 45 | 7.75 |
| | 3200 | 128/256 | 128/160 | 36 | 7 | 27 | 7.25 |
| 22800 | 3200 | 128/256 | 160/192 | 3 | 7.25 | 60 | 7.5 |
| 24000 | 3200* | 128/256 | 192/240 | 33 | 7.5 | 30 | 7.75 |
| | 3200 | 128/256 | 240/256 | 33 | 7.75 | 30 | 8 |
| 125200 | 3200* | 256 | 256 | 63 | 8 | 0 | 8.25 |
| | 3200 | 256 | 320 | 63 | 8.25 | 0 | 8.5 |

*uncoded

As illustrated in the above TABLE 1 fractional bit binary mapping cannot be implemented for all bit rates. To implement a 1/n binary fraction, the uncoded constellation should be greater than or equal to $2^n$. The items with asterisks are uncoded system, i.e., the rest of the modes of operation utilize convolutional encoding. In TABLE 1, "WBBM" means the whole bit binary mapping method of obtaining fractional bits per baud four each frame, i.e., the average bits per baud over the multiple bauds of this frame are fractional bits per baud. "FBBM" means the fractional bit binary mapping method of obtaining fractional bits per baud. "SC" stands for secondary channel. Under the third and fourth columns from the right, the number of symbols M of two (and in some cases, one) constellations is provided for each mode of operation. For the whole bit binary mapping of column 3 and the fractional bit mapping of column 4, these two constellations are used to generate fractional bits per baud in a conventional manner. In the case of column 4, the value of M represents the total symbols for the stacked inner and outer constellations and is shown as if they are one constellation. Hereinafter, a formula is provided for specifying, in a known manner, how to break this total number of symbols, into the outer and inner symbols. As described in the Background section which is incorporated herein, each mode of operation requiring fractional bits per baud using the FBBM or WBBM methods, needs the use of at least two different constellations to generate fractional bits per baud, regardless of which method is selected. The entries in TABLE 1 for the "superframes" are discussed hereinafter. Where fractional bits per baud are not needed, only one symbol constellation is shown.

The various combinations of baud rates and data rates without the secondary channel (which are the same as Table 1) are described in the following TABLE 2:

TABLE 2

| Data Rate (B/S) | Baud Rates (Hz) | M For WBBM With SC | M For FBBM With SC | SUPERFRAME | | | |
|---|---|---|---|---|---|---|---|
| | | | | X | Bits/baud | Y | Bits/baud |
| 4800 | 2400* | 4/8 | | 4 | 2 | 0 | 2.25 |
| 7200 | 2400 | 8/16 | | 4 | 3.25 | 0 | 3.5 |
| | 2743 | 4/8 | | 2 | 2.75 | 2 | 3 |
| 9600 | 2400 | 16/32 | | 4 | 4.25 | 0 | 4.5 |
| | 2743 | 8/16 | | 4 | 3.75 | 0 | 4 |
| 12000 | 2400 | 32/64 | | 4 | 5.25 | 0 | 5.5 |
| | 2743 | 16/32 | | 2 | 4.5 | 2 | 4.75 |
| | 2954 | 16/32 | | 3 | 4.25 | 1 | 4.5 |
| 14400 | 2400 | 64/128 | 80/96 | 4 | 6.25 | 0 | 6.5 |
| | 2743 | 32/64 | | 4 | 5.5 | 0 | 5.75 |
| | 2954 | 32/64 | | 2 | 5 | 2 | 5.25 |
| 116800 | 2400 | 128/256 | 160/192 | 4 | 7.25 | 0 | 7.5 |
| | 2743 | 64/128 | 80/96 | 2 | 6.25 | 2 | 6.5 |
| | 2954 | 32/64 | | 1 | 5.75 | 4 | 5.25 |
| | 3200 | 32/64 | | 4 | 5.5 | 0 | 5.75 |
| 19200 | 2743 | 128/256 | 160/192 | 4 | 7.25 | 0 | 7.5 |
| | 2954 | 64/128 | 120/128 | 4 | 6.75 | 0 | 7 |
| | 3200 | 64/128 | 80/96 | 4 | 6.25 | 0 | 6.5 |
| 21600 | 2743* | 128/256 | 240/256 | 2 | 7.75 | 2 | 8 |
| | 2954 | 128/256 | 192/240 | 3 | 7.5 | 1 | 7.75 |
| | 3200 | 128/256 | 128/160 | 4 | 7 | 0 | 7.25 |
| 22800 | 3200 | 128/256 | 160/192 | 2 | 7.25 | 2 | 7.5 |
| 24000 | 3200* | 128/256 | 192/240 | 4 | 7.5 | 0 | 7.75 |
| | 3200 | 128/256 | 240/256 | 4 | 7.75 | 0 | 8 |
| 125200 | 3200* | 256/512 | 256/320 | 2 | 7.75 | 2 | 8 |
| | 3200 | 256/512 | 320/384 | 2 | 8 | 2 | 8.25 |

*uncoded

The columns in the above TABLE 2 dealing with constellations and superframes will be discussed hereinafter. Except for the length of the superframes, there are very few differences between the two tables. The explanations of TABLE 1 are applicable to TABLE 2.

For each of the modes of operation for the adaptive modem, the following TABLE 3 provides the same information as in the other tables, except for the radix mapping method with secondary channel.

TABLE 3

| Data Rate (B/S) | Baud Rates (Hz) | M For Radix No SC | SUPERFRAME | | | |
|---|---|---|---|---|---|---|
| | | | X | Bits/baud | Y | Bits/baud |
| 4800 | 2400* | 4/8 | 55 | 2 | 8 | 2.25 |
| 7200 | 2400 | 8/16 | 51 | 3.25 | 12 | 3.5 |
| | 2743 | 4/8 | 21 | 2.75 | 42 | 3 |
| 9600 | 2400 | 20/24 | 47 | 4.25 | 16 | 4.5 |
| | 2743 | 8/16 | 49 | 3.75 | 14 | 4 |
| 12000 | 2400 | 40/48 | 43 | 5.25 | 20 | 5.5 |
| | 2743 | 24/28 | 14 | 4.5 | 49 | 4.75 |
| | 2954 | 20/24 | 31 | 4.25 | 32 | 4.5 |
| 14400 | 2400 | 80/96 | 39 | 6.25 | 24 | 6.5 |
| | 2743 | 48/56 | 42 | 5.5 | 21 | 5.75 |
| | 2954 | | 12 | 5 | 51 | 5.25 |
| 116800 | 2400 | 160/192 | 35 | 7.25 | 28 | 7.5 |
| | 2743 | 80/96 | 7 | 6.25 | 56 | 6.5 |

TABLE 3-continued

| Data Rate (B/S) | Baud Rates (Hz) | M For Radix No SC | SUPERFRAME | | | |
|---|---|---|---|---|---|---|
| | | | X | Bits/baud | Y | Bits/baud |
| | 2954 | 64/80 | 56 | 5.75 | 7 | 5.25 |
| | 3200 | 48/56 | 42 | 5.5 | 21 | 5.75 |
| 19200 | 2743 | 160/192 | 35 | 7.25 | 28 | 7.5 |
| | 2954 | 112/128 | 37 | 6.75 | 26 | 7 |
| | 3200 | 80/96 | 39 | 6.25 | 24 | 6.5 |
| 21600 | 2743* | 224/256 | 0 | 7.75 | 63 | 8 |
| | 2954 | 192/224 | 18 | 7.5 | 45 | 7.75 |
| | 3200 | 128/160 | 36 | 7 | 27 | 7.25 |
| 22800 | 3200 | 160/192 | 3 | 7.25 | 60 | 7.5 |
| 24000 | 3200* | 192/224 | 33 | 7.5 | 30 | 7.75 |
| | 3200 | 224/256 | 33 | 7.75 | 30 | 8 |
| 125200 | 3200* | 256/ | 63 | 7.75 | 0 | 8 |
| | 3200 | 320/ | 63 | 8 | 0 | 8.25 |

*uncoded

The radix mapping without the secondary channel, not shown in a separate TABLE, changes only slightly from TABLE 2. For the 16,800 b.p.s./ 2954 bauds mode of operation, the symbols M become 36/64 instead of 64/80. Hence, the TABLE for radix mapping without secondary channel is not provided here, since TABLE 2 provides all the necessary information, with the one difference indicated above. Again, the superframes lengths are reduced when the secondary channel is excluded, as is discussed hereinafter. When reference is made hereinafter to TABLE 2, it is intended to be with respect to all three mapping methods, including radix mapping.

Figure 7:
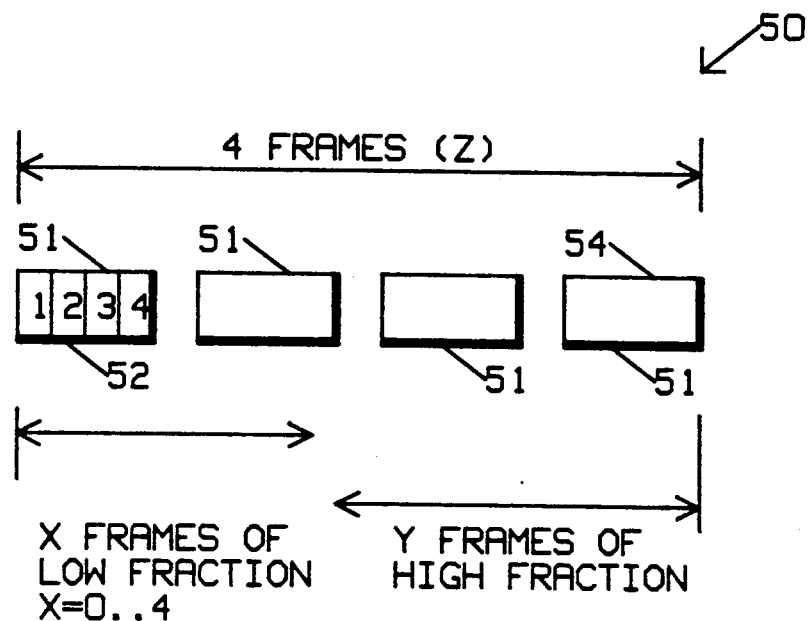
FIG. 7 is a superframe according to the present invention without secondary channel.

Turning to FIG. 7 there is shown a superframe 50 for modes of operation (as shown in TABLE 2) not having a secondary channel. In most, but not all, of the modes of operation, the symbol mappers 42 generate their desired average bits per baud by using at least two different symbol constellations (as shown in TABLE 2) within a superframe 50. The methodology used to develop the superframe 50 is hereinafter described.

Referring to FIG. 7, for most of the modes of operation of Table 2 (without the secondary channel), one of the symbol mappers 42 generates a superframe 50 which includes Z frames 51 of bits per baud, where Z=4. The number Z is selected to be the number of frames 51 needed for all the modes of operation without the secondary channel to repeat their bit pattern, although individual modes of operation may repeat their patterns in substantially shorter number of frames 51. For a given mode of operation presented in TABLE 2, the frames 51 extend over a baud period of preferably, but not necessarily, four bauds as shown by the numbers 1 through 4 in FIG. 7. These frames 51 have an average bits per baud over this four baud period that is either a fractional bit number or a whole bit number. In other words, each of the frames 51 include the bits per baud for four baud intervals, as shown in FIG. 7.

Referring to FIG. 7 in conjunction with TABLE 2, the symbol mappers in the preferred embodiment generate modulation schemes which include either a) only frames 51 of the same type, either having whole bits or fractional bits per baud or b) superframes 50 having two types of frames 51, a low bit frame 52 and a high bit frame 54. In the latter case, two possibilities exist for the superframe: 1) one of the frames 52 or 54 use fractional bits per baud and the other uses whole bits per baud or 2) both of the frames use fractional bits per baud. As may be seen from TABLE 2, the latter two possibilities encompassed by the superframe 50 utilize frames 52 and 54 preferably, but not necessarily, generated from the use of just two symbol constellations (where the inner and outer stacked constellations are considered to be one). The fractional bits per baud for one or both frames 52 and 54, as the case may be, are generated using the "radix mapping" of the present invention (TABLE 2, modified as indicated above), "fractional bit binary mapping" (TABLE 2) or "whole bit binary mapping" (TABLE 2), with the latter two being described in the Background Section. In other words, within a given one of the superframes 50, the appropriate symbol mapper 49 of FIG. 6 may use combinations of two constellations not only to create fractional average bits per baud within a given frame 51, but within the superframe to create portions (X frames 52 and Y frames 54) of the superframe which have differing average bits per baud.

Referring to FIG. 7, in the case where two frames 52 and 54 are used to create a superframe 50, with a selection of the fractional difference between the high bit of the low bit frame 52 and the low bit of the high bit frame 54, e.g., ¼ bit (as in the preferred embodiment) or ½ bit, there will be X frames 52 of low bits and Y frames 54 of high bits. With the superframe 50 having Z frames, $Z = X + Y$. The X frames 52 and Y frames 54 each have an average bits per baud (either an integer or non-integer fraction), which when averaged together, creates the desired average bits per baud for the applicable superframe 50.

Referring back to TABLE 2, for each mode of operation, if only one type of frames 51 are used, there number is shown under "X" in the TABLE, and would be four. "Y" would be shown as zero. The bits per baud are provided under "X Frames". In these modes of operation, no superframe is needed, and the adaptive modem operates in a conventional manner. For those modes of operation wherein both frames 52 and 54 are used to generate a superframe 50, the numbers X and Y are provided and the bits per baud for each is provided under "X Frames" and "Y Frames", respectively.

Referring to FIG. 7, it will be clear to those skilled in the art that the frames 52 and 54 may be intermixed and scrambled any manner so desired, as long as the numbers X and Y do not change. As will become more evident from the modes of operation wherein the secondary channel is included, generally it is desirable for the low bit frames 52 and the high bit frames 54 to be interleaved for more uniform energy distribution. It will also be clear to those skilled in the art to that one or more additional groups of frames may be added to the superframe 50, over and above those of the frames 52 and 54, with such additional group(s) having different average bits per baud from those of frames 52 and 54. Such additional group(s) may assist in further decreasing the difference of the average bits per baud between respective modes of operations, i.e., provide finer granularity between modes of operation of the adaptive modem. Moreover, for a given mode of operation, the duration of the superframe 50 may be defined to be shorter or longer, e.g., where X and Y are both equal to 2, the superframe 50 could be reduced to two frames 51, one being a low bit frame 52 and one being a high bit frame 54.

Figure 8:
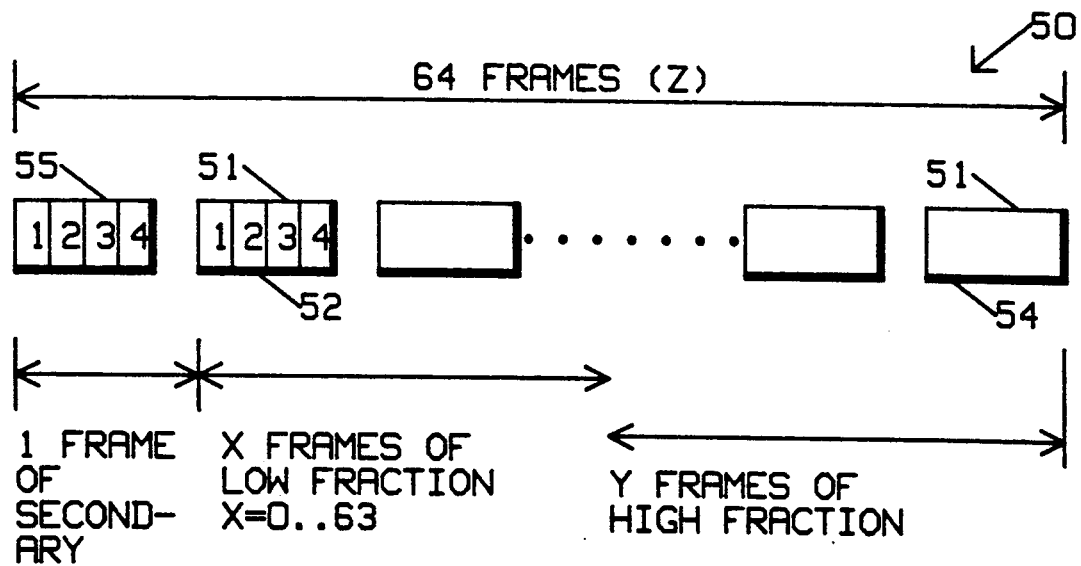
FIG. 8 is a superframe according to the present invention with a secondary channel.

In the preferred second embodiment the inclusion of a secondary channel (TABLES 1 and 3) is an optional feature, as shown in FIG. 8 with the inclusion of a four baud frame 55. However, when the secondary channel is included, due to the use of the superframe 50, a new baud rate is not required for each previous baud rate existing without the secondary channel, as shown by TABLES 1 and 3. To the contrary, according to the present invention, by merely changing to a different superframe 50, having a slightly higher average bits per baud than the previously mentioned superframe, without changing the baud rate, this accommodation of the secondary channel can be accomplished without any hardware change or strapping necessitated by increasing the bandwidth. As can be seen from TABLES 1 and 3, in comparison with TABLE 2, the value of Z, the number of frames 51, increases with the secondary channel over that existing without the secondary channel. This extension of the length of the superframe 50 allows for the accommodation of a small increase in the average bits per baud of the superframe 50 necessary to include the secondary channel. This use of the superframe 50 methodology eliminates the necessity for increasing the bandwidth if the secondary channel option is selected or eliminated and uses the same transmitter control program whether the secondary channel option is selected or not. To the contrary, a simple table look-up into the previously described TABLES allows for the inclusion or elimination of the secondary channel.

As shown in FIG. 8, when the secondary channel shown in FIG. 6 is included, the Z frames 51 of main channel data of FIG. 7 is transmitted in Z-1 frames 51 in FIG. 8 and one frame 55 is released to send the secondary channel data. In this case, the data transmission in the main data frames 52 and 54 increases by a small fraction (1/Z-1). In other words, the baud rate remains the same, but the average number of bits per baud increases over the Z-1 frames 51 of main channel data to compensate for the inclusion of the secondary channel. TABLE 2 provides the values of X and Y for the low and high bit frames 52 and 54, respectively, and the bits per baud rates for each.

With respect to TABLES 1 and 2, the values of X and Y and the bits per baud for each of the frames shown in the TABLES are stored in a look-up table and accessed by the symbol mappers 42.

With reference to FIG. 8, one of the data rate/baud rate combinations, i.e., modes of operation shown in the TABLES 1 and 3 is further defined as the follows: 19,200 b.p.s., 2743 bauds, Z=64, secondary channel slot rate: 2743=42.9 Hz, secondary data rate=86 b.p.s. for 2 bits/baud coding. The main data rate with the secondary channel is 7(64/63)=7.1111 bits per baud. As will be explained in detail hereinafter, an 8-dimensional convolutional code is used at this data rate, which adds another 0.25 bits per baud, resulting in:

Data rate (7.11)+8D coding=7.36 bits/baud This is with the secondary channel, i.e., X frames 52 of low bits, Y frames 54 of high bits, and one frame of secondary data rate. In the preferred embodiment, when the above mentioned difference in the low and high bits are selected to be 0.25 bits, there will be 35 frames 52 of low bits (in this case, 7.25 bits/baud) and 28 frames of high bits (in this case, 7.5 bits/baud), as shown in TABLE 2. In other words, X=35 and Y=28 and both of the frames 52 and 54 have fractional bits per baud, but they are different. To obtain the fractional bits per baud for frames 52 and 54, at least two symbol constellations are used for the frames 52 of low bits and at least two constellations for the frames 54 of the high bits. In the preferred embodiment, the same two constellations are preferably, but not necessarily, used for both the low and high bit frames 52 and 54.

With reference to FIG. 7, in the above illustrative mode of operation of the adaptive modem at the selected data rate/baud rate, if the secondary channel is removed, during the baud period of the 64 baud superframe, there needs to be 64 frames 52 of low bits (7.25 bits/ baud) and no frames 54 of high bits (7.5 bits per baud), as shown in TABLE 2. In other words, X=64 and Y=0. Hence, in a subset of modes of operation in the preferred embodiment, it becomes unnecessary to have a superframe 50 using two frames 52 and 54; hence, a use of a conventional modulation scheme can be used for this modulation scheme.

Following the same methodology, but using a difference of 0.5 bits between the low bits and the high bits, without the secondary channel, there would be 32 frames 52 of low bits (7 bits per baud) and 32 frames 54 of high bits (7.5 bits per baud). This would reduce to a smaller superframe, e.g., X=1, Y=1.

As we can see from the three illustrative examples above for the 19,200 b.p.s./2743 baud rate mode of operation, two of the three examples use a superframe 50 according to the present invention, with each superframe 50 having at least one of the frames 52 or 54 having fractional bits per baud. As shown in TABLES 1, 2 and 3, the difference between the high and low bits preferably has been selected to be 0.25 bits, although those skilled in the art may find it convenient to use other differences, either higher or lower.

In summary, there are two characteristics of the symbol mappers of the present invention which require the use of fractional bit signalling rates:
A) support of a wide range of data rates (4.8 Kb/s -25.2 Kb/s) and symbol rates (2400 Hz -3200 Hz) and
B) support of coding which involves the addition of a fractional redundant bit per 2 dimensions such as the case with 8D coded modulation.

In general, fractional bit signalling rates can be achieved by switching between 2-dimensional constellations within a superframe. The symbol mappers of the present invention preferably uses "quarter bit signalling" in order to achieve the fractional bit rates for the adaptive modem. The term "quarter bit" is utilized because base signalling rates are combined modulo 0.25. This fractional bit signalling encompasses the three previously described mapping methods supports a secondary channel. Moreover, two of the three mapping methods, the fractional bit binary mapping and the non-binary radix mapping will support particularly well Tomlinson precoding. Optimum performance is achieved for Tomlinson precoding if the modulo boundary is set as close as possible to the signal constellation. This requires that the size of the symbol constellation be deterministic from symbol period (baud) to symbol period (baud).

Referring to FIGS. 7 and 8, with and without the secondary channel, the superframe 50 of length Z is defined with each frame 51 of length four bauds. The length of the superframe 50 is governed by the granularity of the data rate. Without the secondary channel, for a 2400 bps granularity, the superframe is of has four frames 51. For a 1200 bps granularity, the superframe's length is increased from four frames 51 to eight frames 51 or alternatively, each frame 51 is increased from four bauds to eight bauds. In the preferred embodiment, the modes of operation without the secondary channel is defined for a 2400 bps granularity system and has four frames 51 in the superframe 50, the total length of the superframe is 16 bauds. For implementability the frame 51 is chosen to be an integral multiple of the coding interval utilized in the m dimensional coded modulation. For an 8-dimensional coded system, the coding interval and the frame 51 size are both four bauds. In the preferred embodiment, the difference between the high and low frame 52 and 54 are selected so that if P equals the number of bits that are signalled per baud in the X frames 52, then P+0.25 equals the number of bits that are signalled in the Y frames 54.

At the end of this section a transmitter flow chart is included in psuedocode form. This code covers one way of implementing the methodology of generating superframes provided above and is capable of generating the low and high frames of bits per baud using the radix method, the fractional bit binary mapping and the whole bit binary mapping.

Generally, there are a number of efficient quarter bit symbol mappers that are available in the prior art for generating frames 51 having the fractional bits of 0.25, 0.5, and 0.75 bits, using the previously described whole bit binary mapping or the fractional bit binary mapping. This document provides quarter bit symbol mappers using the radix mapping of the present invention.

Briefly, a comparison of the three previously mentioned techniques for providing the fractional bits per baud for the superframes is hereinafter provided. With "fractional bit binary mapping", the fraction to be sent is expanded into a sum of n binary fractions, meaning $f = \text{sum}\{a_i/(2^i)\} a_i = 0 \text{ or } 1; i = 1, \ldots n$. The constellation is expanded by the multiplication of the expansion due to each binary fraction. $CER = cer(1)^* \ldots cer(n)$ where $cer(i) = (1 + a_i/2^i))$ This is the optimum signalling scheme if average energy increase for the fractional bit is concern. The higher the number of fractional binary components, the greater the complexity of implementation.

Example: fraction $\frac{1}{4}$; cer=1.25; fraction $\frac{1}{2}$; cer=1.5; fraction=$\frac{3}{4}$; cer=1.5*1.25=1.875

In comparison with the fractional bit binary mapping, the radix mapping of the present invention is 0.1 dB poorer in average energy, but 7% lower in constellation expansion ratio. With the radix mapping the constellation is expanded by minimum symbols to send the additional fractional bit. A simple implementation uses a divide 9 bits by 5 to send 0.25 fraction; 10 bits by 6 to send 0.5 fraction; and 11 bits by 7 to send a 0.75 fraction. This splits the constellation into 5,6,7 rings respectively and the other uncoded bits select the points in each ring.

Example: fraction $\frac{1}{4}$; cer=5/4=1.25; fraction $\frac{1}{2}$; cer=6/4=1.5; fraction=$\frac{3}{4}$; cer=7/4=1.75;

The whole bit binary mapping is simplest to implement. With this mapping any fraction is expressed in terms of the existence or absence of whole bits. A $\frac{1}{4}$ fraction is equivalent to 1,0,0,0 that is out of every 4 frame, 1 frame is signalled using 1 more bit/baud over the other three frames. This is.4db poorer in average energy and suffers a high constellation expansion with respect to binary fraction method.

Example: fraction $\frac{1}{4}$; cer=2.0; fraction $\frac{1}{2}$; cer=2.0; fraction =$\frac{3}{4}$; cer=2.0;

Although not part of the present invention, and utilizing well known techniques, the methodology of utilizing inner and outer constellations based on "fractional bit binary mapping" and the whole bit binary mapping will be explained further to show how it may be used to generate all of the mapping schemes necessary for the above described modes of operation of the adaptive modem. Additionally, the radix (non-binary portion) will be described.

As discussed in detail in the Background Section and in U.S. Pat. No. 4,761,784 (which is incorporated by reference herein), the 7.25 bits per baud used for the 19.3k/2743 mode of operation may be generated by the previously described fractional bit binary mapping technique using inner and outer symbols, which results in the use of an inner symbol constellation of 128 symbols and an outer symbol constellation stacked on the inner constellation consisting of 32 symbols. The mapping scheme, which has already been provided, is as follows:

| Uncoded Bits | | | | Coded Bits | | | |
|---|---|---|---|---|---|---|---|
| 21 bits(5.25 bits/baud) uncoded bit to constellation symbol index (5.25 bits/baud) | | | | 7 bits(1.75 bits/baud) coder (+1) (2 bits/baud) | | | |
| 1 | 2 | 3 | 4 | 1 | 2 | 3 | 4 |
| 0     xxxxx | xxxxx | xxxxx | xxxxx | xx | xx | xx | xx |
| 1 00  xxx | xxxxx | xxxxx | xxxxx | xx | xx | xx | xx |
| 1 01  xxxxx | xxx | xxxxx | xxxxx | xx | xx | xx | xx |
| 1 10  xxxxx | xxxxx | xxx | xxxxx | xx | xx | xx | xx |
| 1 11  xxxxx | xxxxx | xxxxx | xxx | xx | xx | xx | xx |

This scheme is not further discussed here since it was discussed in detail in the Background section. It is merely repeated in part here to be a starting point for generalizing an approach to be used with all the bit per baud rates. Generalizing this technique for the one quarter bits for any of the bits per baud rates, the number of symbols in the inner constellation is $2^K$, then the number of symbols in the outer constellation is $2^{k-2}$. To generate the one-half bits per baud, the number of symbols in the inner constellation remain the same, but the number of outer symbols in the outer constellation is $2^{k-1}$. To generate the three quarters bits, the number of symbols in the inner constellation remains the same, but the number of outer symbols in the outer constellation is $2^{K-1} + 2^{k-2} + 2K^{K-3}$.

Figure 8A:
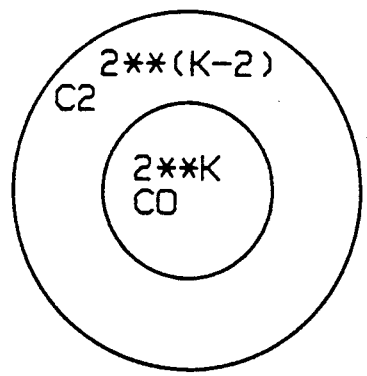
FIGS. 8A through 8E provide ring diagrams to assist in understanding the three fractional bit mapping methods.

The following will be a generalization of the number and location of the inner and outer symbols for 0.25, 0.5, and 0.75 bits. With respect to the fractional bit binary mapping, the following applies:

As shown in FIG. 8A

---
Fraction = 1/4
bit/baud = K + 0.25
bits/frame = 4*K + 1
X(4*K). .. X(0)
---

K bits select symbols of C0.
K-2 bits select symbols from C2.

Figure 8B:
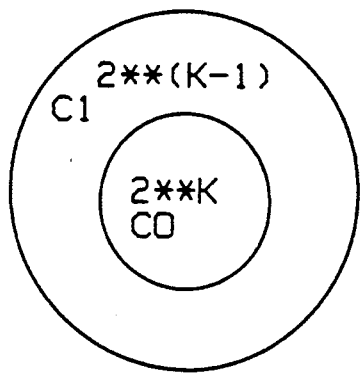

As shown in FIG. 8B:

---
Fraction = 1/2
bit/baud = K + 0.5
Bits/2baud = 2*K + 1
X(2*K). .. X(0)
---

K bits select symbols of C0.
K-1 bits select symbols of C1.

Figure 8C:
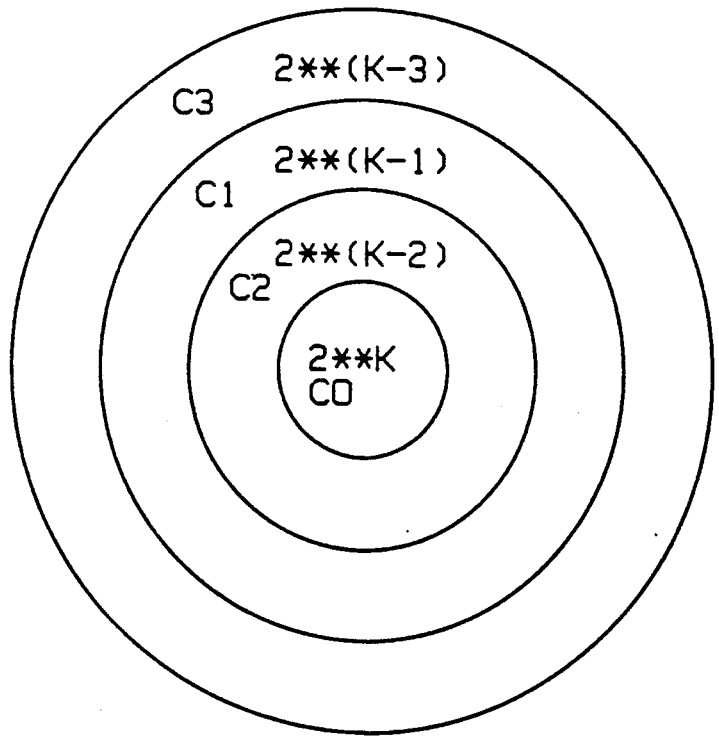

As shown in FIG. 8C:

---
Fraction = 3/4
bits/baud = K + 0.75
bits/frame = 4*K + 3
K bits ..C0
---

---
-continued
K-2 bits ..C2
K-1 bits ..C1
K-3 bits ..C3
C0 → 1
C2 → 1/4 of C0
C1 → 1/2 of C0
C3 → 1/2 of C2
---

The binary fraction mapper rule is as follows:

---
Fraction = 1/4
C0 = 2K; C2 = 2(K−2)
data = 1,2,3,4 ... 4K,4K+1
when 1 = 0,              C0,C0,C0,C0
when 1,2,3 = 1,0,0       C2,C0,C0,C0
when 1,2,3 = 1,0,1       C0,C2,C0,C0
when 1,2,3 = 1,1,0       C0,C0,C2,C0
when 1,2,3 = 1,1,1       C0,C0,C0,C2
Fraction = 1/2
C0 = 2K; C1 = 2(K−1)
data 1,2,3 ... 2K,2K+1
when 1 = 0               C0,C0
when 1,2 = 1,0           C1,C0
when 1,2 = 1,1           C0,C1
Fraction = 3/4
C0 = 2K; C1 = 2(K−1); C2 = 2(K−2); C3 = 2(K−3)
data = 1,2,3,4,5,6,7,8 ... 4K,4K+1,4K+2,4K+3
when 1,4,6 = 0,0,0       {C0,C0}·{C0,C0}
when 1,4 = 0,1; 5 = 0/1  {C1,C0}
when 1,6 = 0,1; 7 = 0/1  {C1,C0}
when 1,2,3 = 1,0,0       {C0,C0} {x,x} => {C2,C0} {x,x}
                         {C1,C0} {x,x} => {C3,C0} {x,x}
                         {C0,C1} {x,x} => {C2,C1} {x,x}
when 1,2,3 = 1,0,1       {C0,C0} {x,x} => {C0,C2} {x,x}
                         {C1,C0} {x,x} => {C1,C2} {x,x}
                         {C0,C1} {x,x} => {C0,C3} {x,x}
when 1,2,3 = 1,1,0       {x,x} {C0,C0} => {x,x} {C2,C0}
                         {x,x} {C1,C0} => {x,x} {C3,C0}
                         {x,x} {C0,C1} => {x,x} {C2,C1}
when 1,2,3 = 1,1,1       {x,x} {C0,C0} => {x,x} {C0,C2}
                         {x,x} {C1,C0} => {x,x} {C1,C2}
                         {x,x} {C0,C1} => {x,x} {C0,C3}
---

Figure 8D:
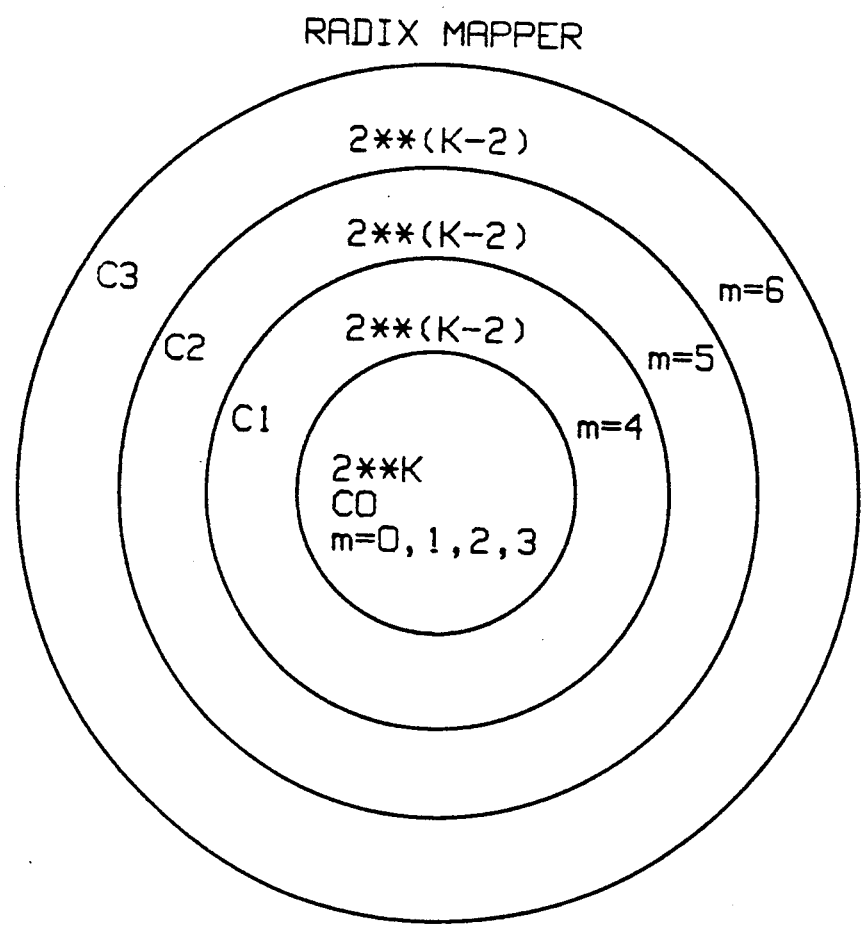

With respect to the radix (non-binary portion) mapping, in conjunction with FIG. 8D the following applies:

---
Fraction = 0
bits/baud = K
M = 4, P = 4, R = 2
Radix_4(2**8) = m:{ 0,1,2,3}
C0
Fraction = 1/4
bits/baud = K +0.25
bits/frame = (4K−8) +9
M = 5, P = 4, R = 2.25
Radix 5(2**9) m:{ 0,1,2,3,4}
C0+C1 = 1.25*C0
Fraction = 1/2
bits/baud = K +0.5
bits/frame (4K−8) + 10
M = 6, P = 4, R = 2.5
Radix 6(2**10) = m: { 0,1 ... ,5}
C0+C1+C2 = 1.5*C0
Fraction = 3/4
bits/baud = K +0.75
bits/frame = (4K−8) +11
M = 7, P = 4, R = 2.75
Radix_7(2**11) = m: { 0,1 ... 6}
C0+C1+C2+C3 = 1.75*C0
---

Figure 8E:
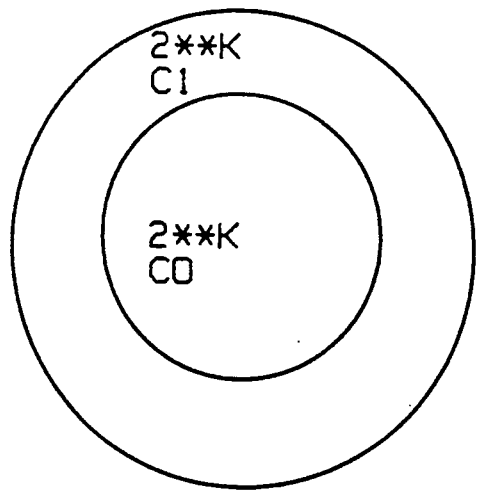

With respect to the whole bit mapping, in conjunction with FIG. 8E the following applies:

---
K bits select C0, C1
---

-continued

```
K + 1 bits select C2
C2 = C0 + C1
Fraction = 0
bit /baud = K
bits/Frame = 4K
C0,C0,C0,C0
Fraction = 1/4
bits/baud K + 0.25
bits/Frame = 4K + 1
C0,C0,C0,C2
Fraction = 1/2
C0,C2,C0,C2
Fraction = 3/4
C0,C2,C2,C2
```

Figure 8F:
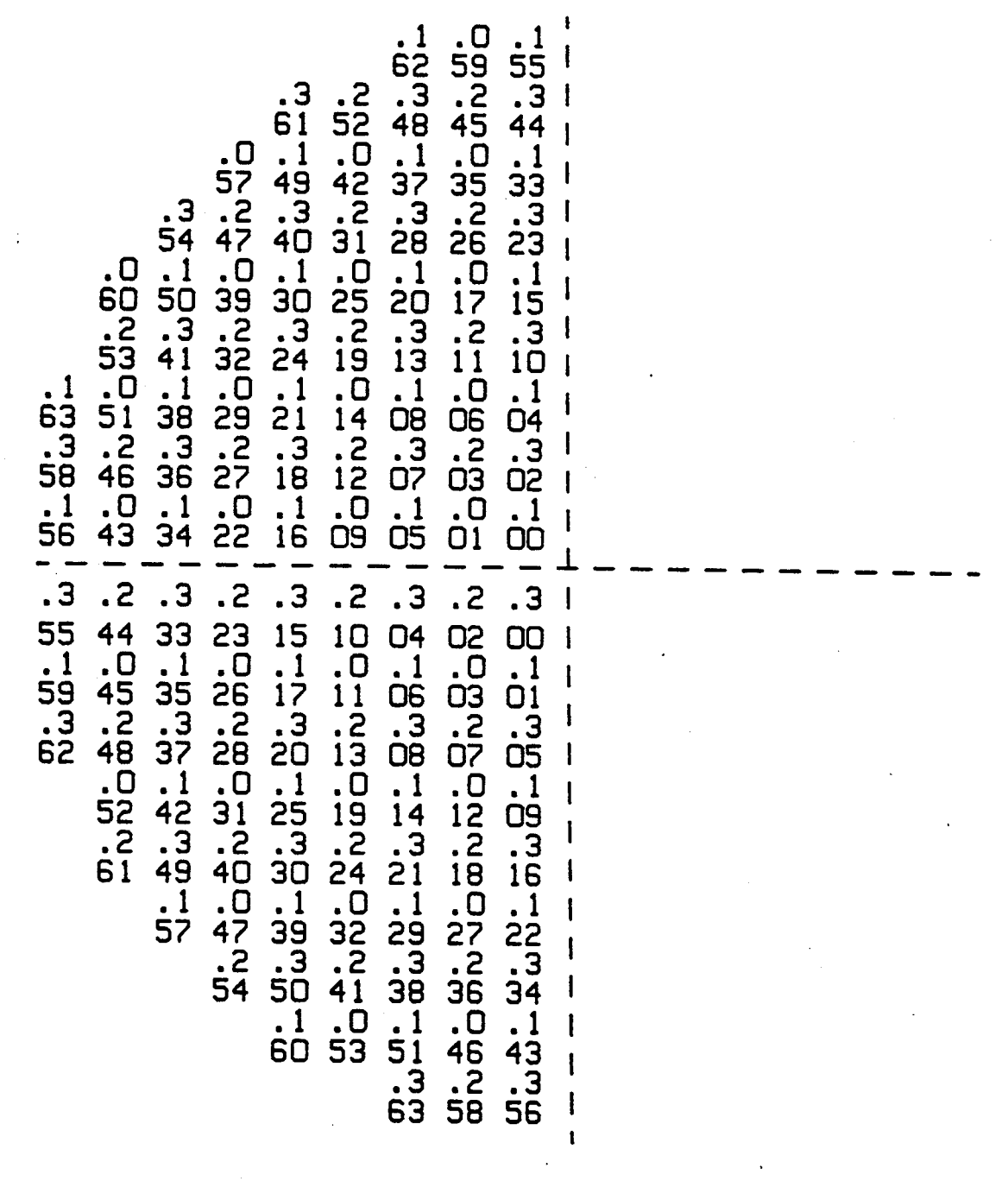
Figure 8G:
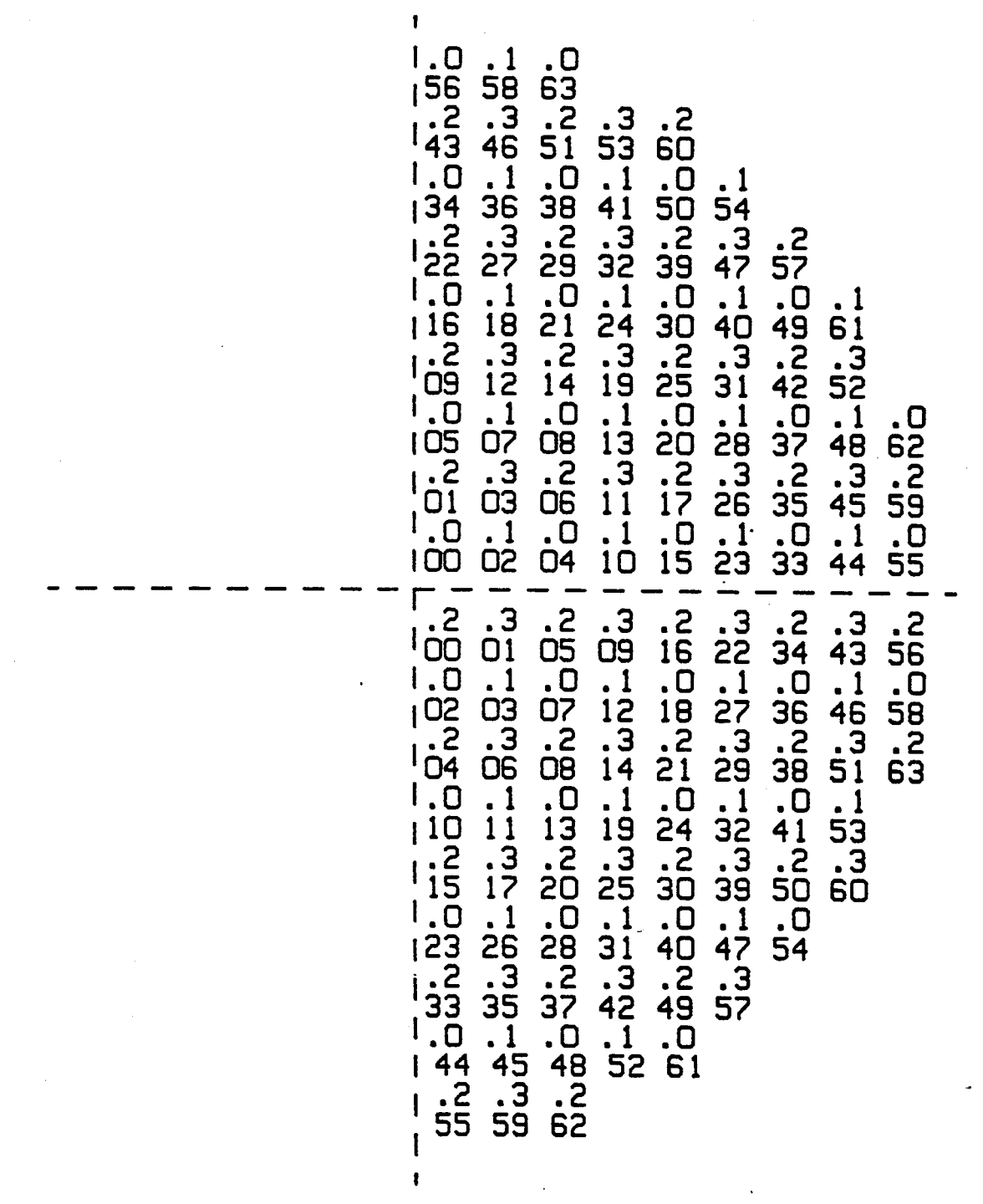

Another feature of the adaptable modem is its conventional use of stacked constellations, as shown by the stacked symbol constellation of FIG. 8F. This symbol constellation has 256 symbols partitioned into four subsets, i.e., symbol constellations, utilizing a z2/2z2 partition, with the four partitions being identified by 0.0, 0.1, 0.2, or 0.2. Each of the symbols are number in order to priority within each subset from 0 to 63, with the larger number symbols being removed first to obtain the reduced symbol constellations. In this conventional manner, this stacked constellation reduces to all the constellations shown in TABLES 1 through 3.

All modes of operation use the same symbol table and the same receiver slicer to make the implementation simpler and memory requirements lower. Generally, as is well known in the art, two sets of constellations may be derived one based on stacked rings and another based on stacked squares. The ring circular constellation provide about 0.2 db improvement over the square constellation in average energy and has about 20% lower peak to rms ratio and are the ones shown in FIG. 8A.

Referring back to FIG. 6A, the transmitter 38 of the first adaptive modem 30 is shown connected to a receiver 40 of the second adaptive modem 36 via the bandlimited transmission line 34. Although not shown, each of the adaptive modems 30 and 36 preferably have the same transmitter and receiver structures and functionality i.e., each modem can transmit as well as receive. The transmitter 38 receives main channel binary data at the selected data rate as described above, which are typically customer data, and preferably, but not necessarily, receives secondary channel binary data, which are data that must undergo more reliable transmission with less errors than the main channel data. In the preferred embodiment, this secondary channel data includes information for controlling, testing, monitoring, configuring the modems, the network and other components of the network. Examples of such information can be found in U.S. Pat. No. 4,385,384 to Rosbury et al, which is incorporated by reference herein. However, it is contemplated that secondary data can be any sensitive data needing lower error rates and/or higher reliability of successful transmission in the presence of line impairments than the main channel data, e.g., where different streams of customer data are to be transmitted, one stream may need the above described special treatment. Normally, although not necessarily, the main channel data are transmitted at a much greater speed, i.e., bits per second (b.p.s.), than the secondary channel data. For example, where the main channel has 19.2K b.p.s. in one of the above described modes of the adaptive modem, secondary channel for network management as described above, may be only 86 b.p.s.

The main channel data are received by one of the main channel data to symbol mappers 42, which includes conventional transmitter components, such as a scrambler; differential encoder; symbol generator; and, in systems using convolutional encoding, a convolutional encoder. The secondary channel data are received by a secondary channel data to secondary channel data to symbol mapper 58 which also includes the normal and conventional elements of a standard modem, such as those in mappers 42 above. However, once one of the symbol mappers 42 have been selected based upon the desired data rate and baud rate, the present invention alternately uses the two mappers 42 and 58, which alternate in transmitting data from the main and secondary channels, respectively. Assuming that initially the maximum data rate of 19,200 b.p.s. is selected, the mapper 42 (specifically mapper 49) is used to encoded the binary data as 2-dimensional symbols (which are selected from a symbol constellation of 2-dimensional symbols, i.e., complex valued symbols) for transmission each symbol interval, i.e., baud period or modulation period. As with a conventional modem, a modulator and bandpass filters 66 are provided so that the selected symbol modulates a carrier each baud and is transmitted over the transmission medium 34.

To have selected the 19,200 b.p.s. speed at a 2743 baud rate, i.e., the symbol mapper 49, selecting between the plurality of symbol mappers 42 (of which symbol mapper 49 is just one) is first necessary. A switching device 62 has a main channel data switch 64 which operates in conjunction with switch 65 and selects from 1 through "n" desired symbol mappers 49 having one of the above described modulation schemes. Data switch 65 directs the input main channel data from a DTE interface 6 to the appropriate mapper depending on which constellation is to be used. A secondary channel mapper 58 similarly receives secondary channel data from a secondary channel interface 69. In this illustrative example, n is equal to the number of modes of operation of the adaptive modem as previously provided, but n can be a larger or smaller number, based upon the number of desired modulation schemes as previously described. To accommodate the two mappers 42 and 58 alternately accessing a single modulator 66, the transmitter switching device 62 includes an alternating channel switch 68 which is periodically switched from one mapper 29 or 58 to the other mapper 58 or 42, respectively. For two channels, the main channel and the secondary channel, this switching occurs at least twice within each of a plurality of repetitive cycles, so that each channel is guaranteed a predetermined number of bauds (symbol intervals) within each given cycle for transmission. In other words, during each cycle there will be transmissions from each channel during time periods of predetermined and fixed durations. For example, the secondary channel data may have access to the modulator 66 for one baud followed by the main channel having access to the modulator for 63 bauds as previously described with respect to FIG. 7. Although in the preferred embodiment, the data switch 64 is automatically adapted to line conditions during start up and during operation, the data switch 64 may be manually set by the user, based upon the user's appraisal of the line conditions.

In general, where the secondary channel data comprises network management and control information, the access of the main channel to the modulator 66 will be significantly greater than the access of the secondary channel to the modulator 66. In general, the secondary channel is implemented in accordance with the previously described U.S. Pat. No. 4,891,806 to Farias et al., which is incorporated by reference hereto. Although the transmitter switching device 62 is illustrated as a hardware element having n positions, preferably it is implemented in a programmed processor.

Figure 6A:
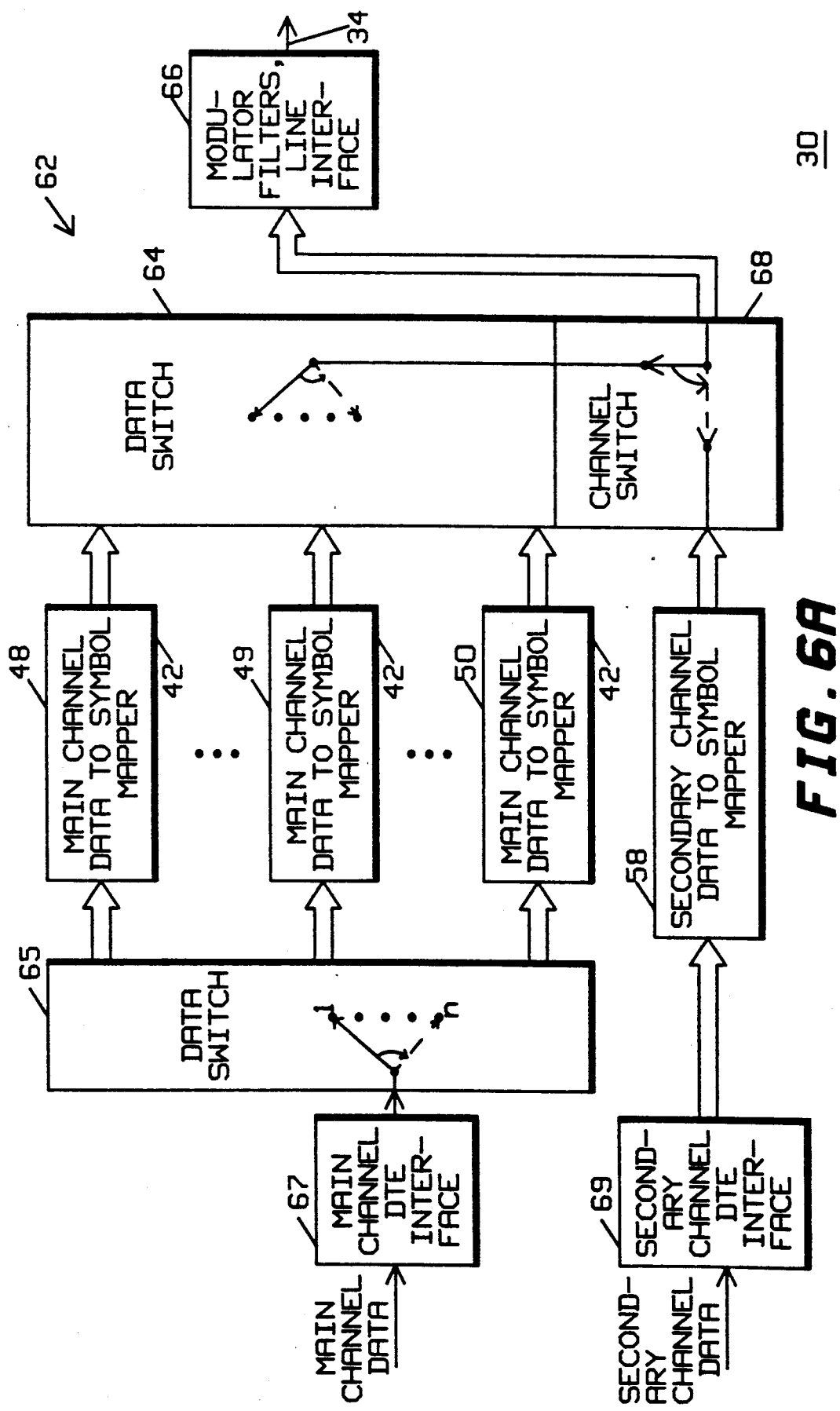
FIG. 6A is a block diagram of a transmitter of a communication device wherein a superframe is generated using fractional bit signalling according to the present invention is implemented.
Figure 6B:
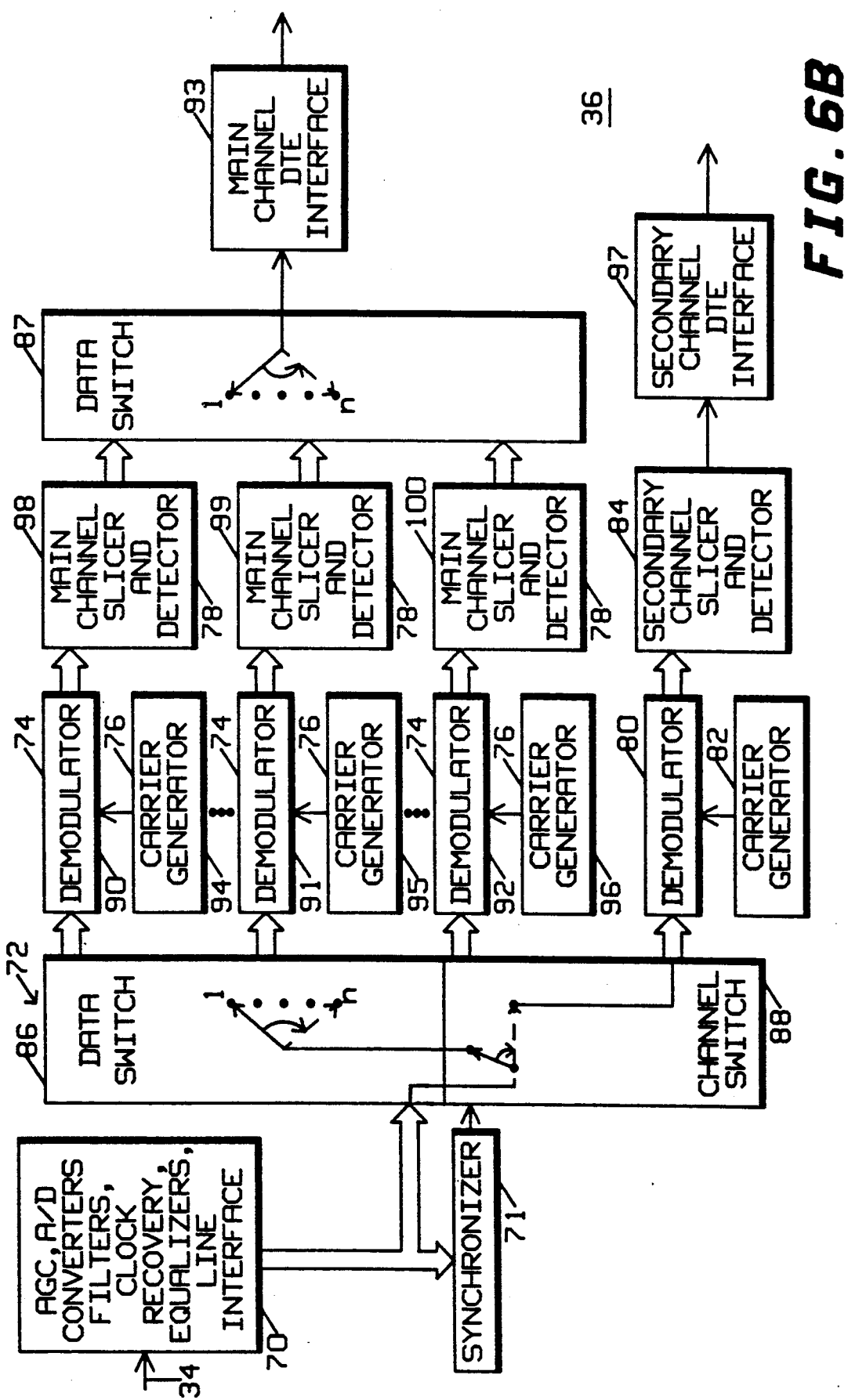
FIG. 6B is a block diagram of a receiver of the communication device of FIG. 6A.

In FIG. 6B, the receiver is shown as signal extracting device having a number of channels equal to the number of channels in the transmitter 38, which includes the main and secondary channels in the preferred embodiment. The receiver receives a modulated carrier signal over the transmission line 34 that has a repetitive cycle of carrier signal portions with each portion having been modulated by symbols for either one of the mappers 42 or mapper 58. Depending upon the implementation, there are modem receiver components in common, such as the normal automatic gain control (AGC), analog to digital (A/D) converter, bandpass filters, clock recovery and equalizer shown in block 70. There are other normal modem functions which are reproduced in each channel or in some cases do not occur in all channels, thereby defining non-common modem functions. The division between common and non-common components is dependent upon the placement of a receiver switching device 72, such switching device 72 being synchronized to the carrier signal portions of each cycle by synchronizer 71, to switch the processed received signal in a repetitive manner between the main and secondary channels. In this manner, the channels obtain a received signal modulated by symbols and by a modulation scheme of a type suited to its individualized components. The main channel includes "n" main channel demodulators 74; "n" carrier generators 76; and "n" main channel slicer and detectors 78; all of which may be of conventional and well-known designs. Analogous to the transmitter 38, in the receiver, there are one of the components 74, 76, and 78 for each of the "n" modulation schemes described above. However, for simplicity, only three of each of these components are shown in FIG. 6B. In other words, the generally identified demodulators 74, carrier generators 76, and main channel slicers and detectors 78 comprise, respectively, specifically identified demodulators 90, 91 and 92; carrier generators 94, 95 and 96; and detectors 98, 99 and 100. The data switch 87 is connected to a main channel DTE interface 93 and the secondary channel slicer and detector 84 is connected to a secondary channel DTE interface 97. The secondary channel includes a demodulator 80; a carrier generator 82; and a secondary channel slicer and detector 84, all of which may be of conventional and well-known design. In general, the components comprising each channel after receiver switching device 72 may comprise any one of many well-known designs for extracting the digital data from received signals of generated by the type of modulation and speed of transmission used in the transmitter 38. Although the demodulators are shown downstream of the receiver switching device 72, one skilled in the art will realize that the demodulators may be placed in block 70 so that the switching operation of the switching device 72 will be a baseband operation.

Referring to FIG. 6B, the receiver switching device 72 includes a main channel data switch 86 and an alternating channel switch 88. The data switch 86 operates in conjunction with data switch 87 to select the appropriate demoduator, detector, slicer and carrier generator. Initially data switches 86 and 87 are set to the desired data rate, e.g., 19,200 b.p.s. in this illustrative mode of operation of the adaptive modems 30 and 36. The data switchs 86 and 87 are set in accordance with the setting of the transmitter data switch. Generally, the two main channel data switches, the data switchs 64 and 65 in the transmitter 38 and the data switches 87 and 88 in the receiver, are set in accordance with the same desired modulation scheme. For example, when the desired data rate is 19,200 b.p.s. at 2743 baud rate, the symbol mapper 49 and the main channel slicer and detector 100 are selected, i.e., position "n" of the four switches 64, 65, 86 and 87. The channel switch 88 alternates in the same manner as channel switch 68 in the transmitter. Depending on the objectives of the modem designer, the receiver switching device 72 also may be located after the demodulator function. In this case the similar components can be merged into a single component. Additionally, as it is well known in the art, the order of the components themselves can often be changed. As with the transmitter switching device 62, the receiver switching device 72 is shown for the purposes of illustration as a hardware component having "n" positions; however, the switching device 72 is preferably implemented in a programmed processor.

As described in incorporated U.S. Pat. No. 4,891,806, during an initial training sequence, channel switch 68 in the receiver 40 is synchronized with channel switch 88 in the transmitter 38 so that appropriate carrier signal portions are allocated to the correct recover channels. However, the use of different signal portions from the main and secondary channels allow for the capability of detecting and correcting for lost synchronization, such as commonly occurs during line drop-outs. Generally, a sliding window, which detects symbols or symbol intervals of higher or lower average energy so as to indicate which carrier signal portions should be allocated to which channel. In other words, the time periods allocated to different symbol constellations are detected. Also, in the case wherein the symbol mapper 42 includes a multidimensional convolutional encoder, the 2-dimensional symbols are grouped into frames to define a multidimensional symbol extending over a number of bauds. Once synchronization is lost, a reference point for each such frame must be detected. Likewise, in applications where the mapper 42 accepts a plurality of main channel data streams and multiplexes them on a time division basis using a multiplexer (not shown), it is necessary to determine a reference point for a masterframe. In the case of two channels, the main channel and the secondary channel, a sliding window is passed over the data and the relative energy of the two symbol constellation are detected to distinguish between the two channels. Either periods of high energy are detected (preferred approach) or periods of low energy are detected in the manner described in the above mentioned incorporated patent.

Figure 9:
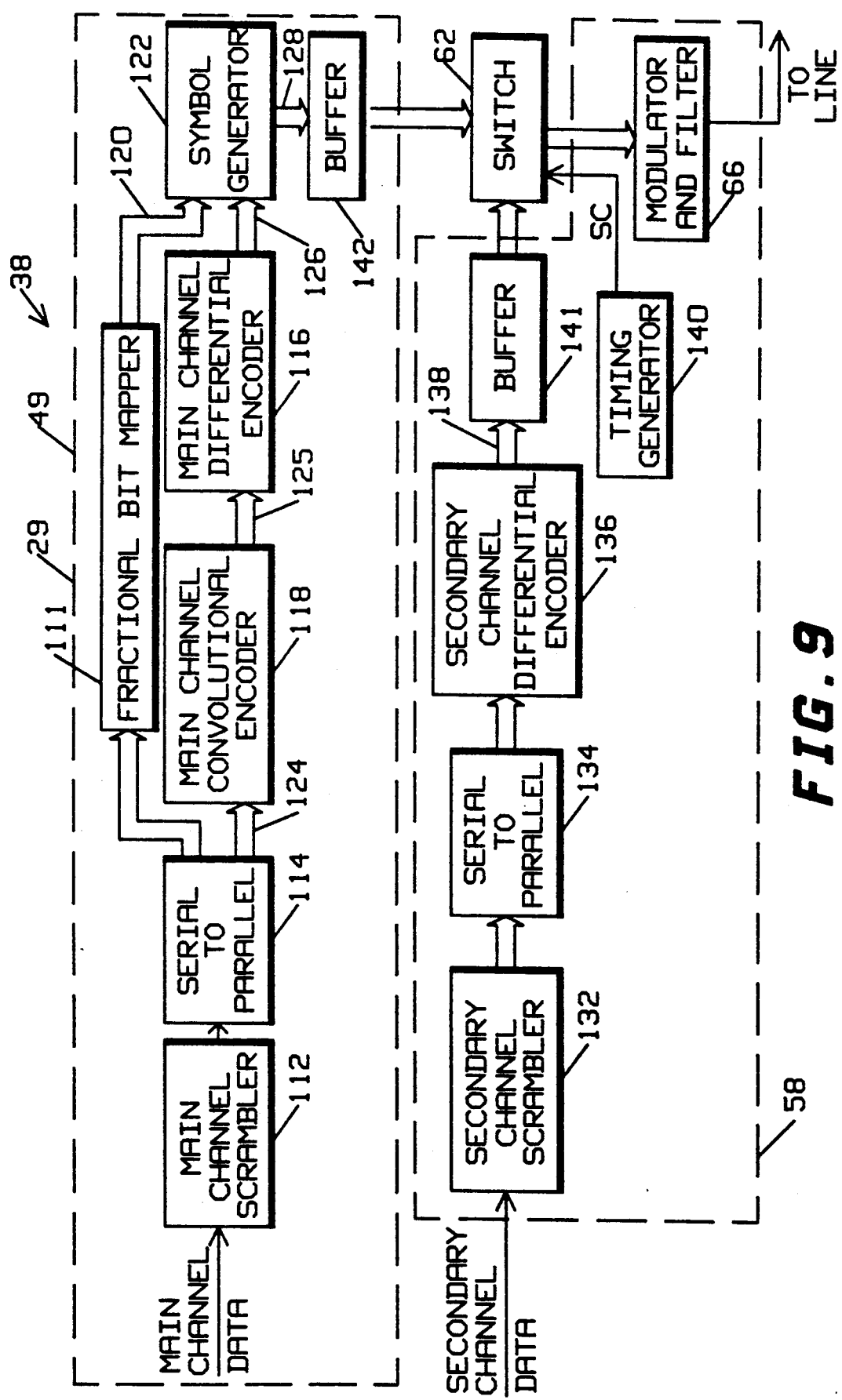
FIG. 9 is a more detailed block diagram of the transmitter shown in FIG. 6A for one of the modes of the adaptive modem.

Referring to FIG. 9, there is shown a more detailed block diagram of the transmitter 38 for one of the modes of operation of the adaptive modem 38, i.e., 19,200 b.p.s. at 2743 bauds. The symbol mapper 49 includes a fractional bit mapper 111. The fractional bit mapping resulting in the superframes of the present invention are generated in the fractional bit mapper 111 in a manner discussed in detail heretofore. Once the data switches 64 and 86 are set, the structure and operation of the modem is essentially the same as shown in incorporated U.S.

Pat. No. 4,891,806; however, to assist in understanding the present invention, the conventional structure is hereinafter described for this one mode of operation and is illustrative of the conventional aspects of the other modes of operation of the adaptive modems 30 and 36. As previously described, in this mode of operation, of the "n" symbol mappers 42, the specific symbol mapper 49 is used for this modulation scheme. In the transmitter 38, main channel data is provided to a main channel scrambler 112 which scrambles the data in a known manner. The scrambled data bits are then provided to a serial to parallel converter 114 which in turn provides the data in the form of a packet of parallel bits to a convolutional encoder 118. A portion of the bits of each packet, symbol-selecting (uncoded) bits 120, by pass the convolutional encoder 118 to a symbol generator 122. The remaining portion 124 of the bits of each packet, symbol-selecting (uncoded) bits 120, by pass the convolutional encoder 118, are passed through the fractional bit mapper of the present invention with the bit output thereof being passed to a symbol generator 122. For example, the fractional bit mapper 111, when using the fractional bit binary method, generates the inner and outer constellations in the same manner as described in the Background section. The remaining portion 124 of the bits of the packet are used by the convolutional encoder 118 to produce convolutionally encoded bits 125. These bits 125 are passed to a differential encoder 116 to be differentially encoded.

The convolutional encoder 118 preferably, but not necessarily, is an encoder which allows for 2m dimensional coded modulation, where m = 4. In the preferred embodiment, for each packet, a portion of the output of the convolutional encoder 118, i.e., subset-selecting bits 126, form a frame of an even number of bits, i.e., the subset-selection bits in a frame consist of 2m bits. The subset-selecting bits 126 are passed to the symbol generator 122. For each received packet, the subsetselecting bits 126 and symbol-selecting bits 120 form an input of the symbol generator that will be identified as the expanded bit sequence. Depending upon the selected desired mode of operation, the transmitter may use any number or type of modulation schemes, coded or uncoded, and the conventional multidimensional coded modulation scheme described hereinafter is merely illustrative of the preferred implementation of one of several modes of operation of the adaptive modem 30. Those skilled in the art will appreciate that differential encoding may be omitted if desired.

In the preferred embodiment the symbol generator 122 for the 19,200 b.p.s/ 2743 baud rate mode of operation, the symbol generator 122 uses a pair (i.e., bit group) of the 2m subset-selecting bits each baud (i.e., symbol interval/modulation period) to specify one of four subsets into which a symbol constellation is portioned. The symbol-selecting bits 120 are used by the symbol generator 122 to select a symbol (i.e., signal point in constellation) from each subset. Consequently, each packet from the converter 116 is mapped onto a group of n 2-dimensional symbols in m bauds (one group interval), where m > 1 and defines a multidimensional point (symbol) 128. The multi-dimensional symbols 128, after passing through the transmitter switching device 62, are filtered in a conventional manner by bandwidth limiting filters and used to modulate a carrier in modulator and filter 66 to provide a modulated carrier signal to a band limited communication channel shown as a transmission line. The symbol generator 122 and modulator and filter 66 operate in conjunction with one another to define a multidimensional coded modulator. More detailed presentation of these components is provided in incorporated U.S. Pat. No. 4,891,806.

Referring again to FIG. 9, a more detailed block diagram of the symbol mapper 58 of FIG. 6 is provided. The secondary channel data is passed to a secondary channel scrambler 132 which also acts in a conventional manner to scramble the secondary channel data which is then passed to a serial to parallel converter 134 which converts the secondary channel data to parallel form for use by a secondary channel differential encoder 136 which encodes, for example, each dibit (group of two bits in the data stream) as a phase change relative to the phase of the immediately preceding secondary channel symbol. Differential encoder 136 encodes the parallel secondary channel data using conventional four phase differential encoding in the preferred embodiment, but this is not to be limiting. Differentially encoded data 138 is passed through switching device 62 and then processed by modulator and filter 66. In the preferred embodiment, the secondary channel does not use a redundancy coding, but this is not to be limiting since such coding could be used if desired. In the preferred embodiment, the fact that the secondary channel uses only four constellation symbols with relatively high average energy assures that the secondary channel is significantly more robust than the main channel, thus reducing the need for redundancy coding. In summary, any number of conventional signal constellations and modulation schemes can be used for either the main channel or the secondary channel; however, with each selected combination of main and secondary channel constellations, the secondary channel is more robust (e.g., better signal to noise ratio) than the main channel.

As previously described, the switching device 62 is used to combine the main channel data with the secondary channel data by essentially switching to a second constellation for the secondary channel when required. In the preferred embodiment, the main and secondary channel data are arranged in a manner in which the switching device 62, under the control of a timing generator 140, respectively provides one frame of four bauds of differentially encoded secondary channel data followed, when in the 19,200 b.p.s. mode of operation, by sixty three frames of convolutionally encoded data in groups of four bauds per frame. Those skilled in the art will appreciate that the main channel and secondary channel data may accumulate and be held in buffers 141 and 142, during the times when the other channel is being transmitted.

In the above described 19,200 b.p.s./2743 baud mode of operation of the adaptive modem 30, the modem essentially is the same as that described in incorporated U.S. Pat. No. 4,891,806, except instead of transmitting one frame of secondary channel ever 48 bauds, a superframe of 64 frames of 4 bauds are repeatedly transmitted with 63/64 of the frames comprising convolutionally encoded main channel data and 1/64 of the master frame comprising a more robust secondary channel data. For a detailed presentation of the components of FIG. 9, an the symbol constellations used with the 19,000 b.p.s./ 2743 baud mode and the secondary channel, reference should be made to the incorporated U.S. Pat. No. 4,891,806. However, the present invention is not limited to the particular superframe and frame arrangement disclosed as preferred. The other symbol mappers 42 for the other modulation schemes of different modes of operation have basically the block diagram, except they may or may not include the convolutional encoder 118 and the differential encoders 116 and 136, as will be clear to those skilled in the art.

As with the transmitter 38, after the data switches 64 and 86 have been set, the remainder of the receiver 40 is structured and operates in a conventional manner. However, a brief description of the conventional structure for the 19200 b.p.s./2743 baud mode will be provided here and this description is also illustrative of the conventional structure and operation of the other modes of operation. The receiver 40 of the adaptive modem is generally shown in the block diagram of FIG. 10 and includes a filter and automatic gain control (AGC) 182 coupled to the transmission medium 34. The filtered and gain controlled signal is passed to a phase and quadrature components in a known manner and passes the components to a passband adaptive equalizer 186. The equalized signals from adaptive equalizer 186 are converted from passband to a 2-dimensional baseband signal by a demodulator 188 and then passed through the data switch 88 of the receiver switching device 70. Since the main data channel switch 72 shown in FIG. 6 has already been set to the proper position for this mode of operation, it is not shown in this FIGURE. During periods of receipt of main channel data, the complex baseband signals from the demodulator 188 are switched by the switch 88 to a slicer 191, branch cost calculator 192, Viterbi decoder 193. The decoded signal from the Viterbi decoder 193 is passed to a main channel differential decoder 194 and then to a convolutional decoder 195 and a main channel descrambler 196 where the main channel data are decoded and descrambled to produce main channel data out. Embodiments of the slicer 191, branch cost calculator 192, and Viterbi decoder 193 are described in detail in U.S. Pat. No. 4,761,784 to Srinivasagopalan et al, which is incorporated by reference. There are a number of designs known to those skilled in the art for these components which can be used with the present invention.

During periods of receipt of secondary channel data, the complex baseband signals from demodulator 188 are switched by switch 88 to a conventional secondary channel slicer 200 which determines by a hard decision which of the four possible phases have been transmitted. The output of secondary channel slicer 200 is passed to a secondary channel differential decoder 202 for decoding in a conventional manner. The decoded data from decoder 202 are then descrambled by a secondary channel descrambler 204 in a known manner. Descramblers 196 and 204 preferably operate in a similar manner and those skilled in the art will recognize that a single descrambler circuit or routine may be utilized for both main and secondary channel by appropriate modification without departing from the present invention.

In a conventional manner, the output of the demodulator 188 is also applied to a synchronization detector 206, the operation of which will be described later, which extracts frame synchronization information for use by the receiver 40. This information is also provided to a timing generator 208 which controls the position of switch 190 so that the baseband signals from the secondary channel are processed by secondary channel slicer 200 the baseband signals from the main channel data are processed by the main channel slicer 191. The switch 88, in steady state operation will be at the position shown (main channel) for 63/64 of the time and at the opposite position (secondary channel) for 1/64 of the time in the preferred embodiment.

Since the secondary channel is substantially more immune to noise than the main channel by virtue of having a higher average energy level and fewer, more distant signal points (i.e., symbols) when line quality is poor, it is desirable to provide certain adjustments and adaptations during periods of secondary channel activity only for the secondary channel. This may be accomplished under steady state conditions by the following. The timing generator 208 produces an output "SC" during time of activity of the secondary channel. This output is passed through an OR decision 210 to produce an "UPDATE" signal which authorizes adaptation of adaptive equalizer 186 and/or may be used to authorize adjustment in the frequency of a carrier generator 187 used by demodulator 188 or other adjustments which may be needed. A convergence estimate such as mean square error or cost from Viterbi decoder 193 is applied to a comparator 214 wherein the convergence estimate, e.g., minimum cost, is compared with a predetermined threshold. If this cost is below the threshold, the signal is applied to an input of an AND decision 215. Also, a signal-to-noise ratio estimate from the training process is compared to a signal to noise ratio threshold in a comparator 216. Its output is also applied to AND decision 215. The output of AND 215 is indicative of main channel signal quality and is applied to the second input of the OR decision 210. In this manner, when there is good main channel signal quality, carrier generator 187 and adaptive equalizer 186 are both allowed to adapt during periods of both main and secondary channel activity. Otherwise adaption only occurs during the secondary channel. The operation of the slicer 191 is described in the incorporated U.S. Pat. No. 4,761,784.

In a conventional manner, from the retained knowledge of the received multidimensional signal and from the knowledge of the closest multidimensional symbol subset of the maximum likelihood path, the best estimate of the transmitted multidimensional symbol (point) is obtained. From the estimated, transmitted multidimensional signal the received data is processed in a well known manner using a differential decoder 194, a convolution decoder 195, a parallel to serial converter (not shown) and a main channel descrambler 196.

In receiver 40, the well known receiver operations are of the branch cost computer 192 and Viterbi decoder 193 synchronized to the received frames of the incoming signal i.e., the receiver must know the beginning of each frame. In other words, the receiver 40 must determine which bit group in the received frame of subset-defining bits corresponds to the bit group in the transmitted subset defining bits. Moreover, the receiver 40 must distinguish between received frames for the main and secondary channels. In other words, it must find the beginning of each master frame. Having found this starting bit group, the received frame of received subset defining bits is synchronized with the consecutive frames of subset-defining bits transmitted as well as the secondary channel data. The secondary channel may advantageously be used at the modem receiver for synchronization.

As is known in the art, high speed modems generally require a training period to initially acquire synchronization and adapt to the conditions of the particular line. The preferred training sequence is shown in general in FIG. 11. Other training procedures and training sequences may be used as is known in the art. At stage 268, a period of clock and carrier training is undertaken. This clock and carrier training period, wherein only carrier and clock information is transmitted, lasts approximately 256 bauds and is referred to as mode 0. At 272, the equalizer and scrambler at the receiver is trained by transmission of random four phase information. This stage lasts for 8400 bauds in one embodiment and is referred to as mode 1. At 274 the scrambler is initialized during this same period of random four phase information. At 276 the Viterbi decoder is synchronized. This stage is referred to as mode 3 and lasts for 256 bauds in the present embodiment. At 278, the steady state condition is reached and user data is processed while fine adjustments and adaptations continue. This stage is referred to as mode 4.

Figure 12:
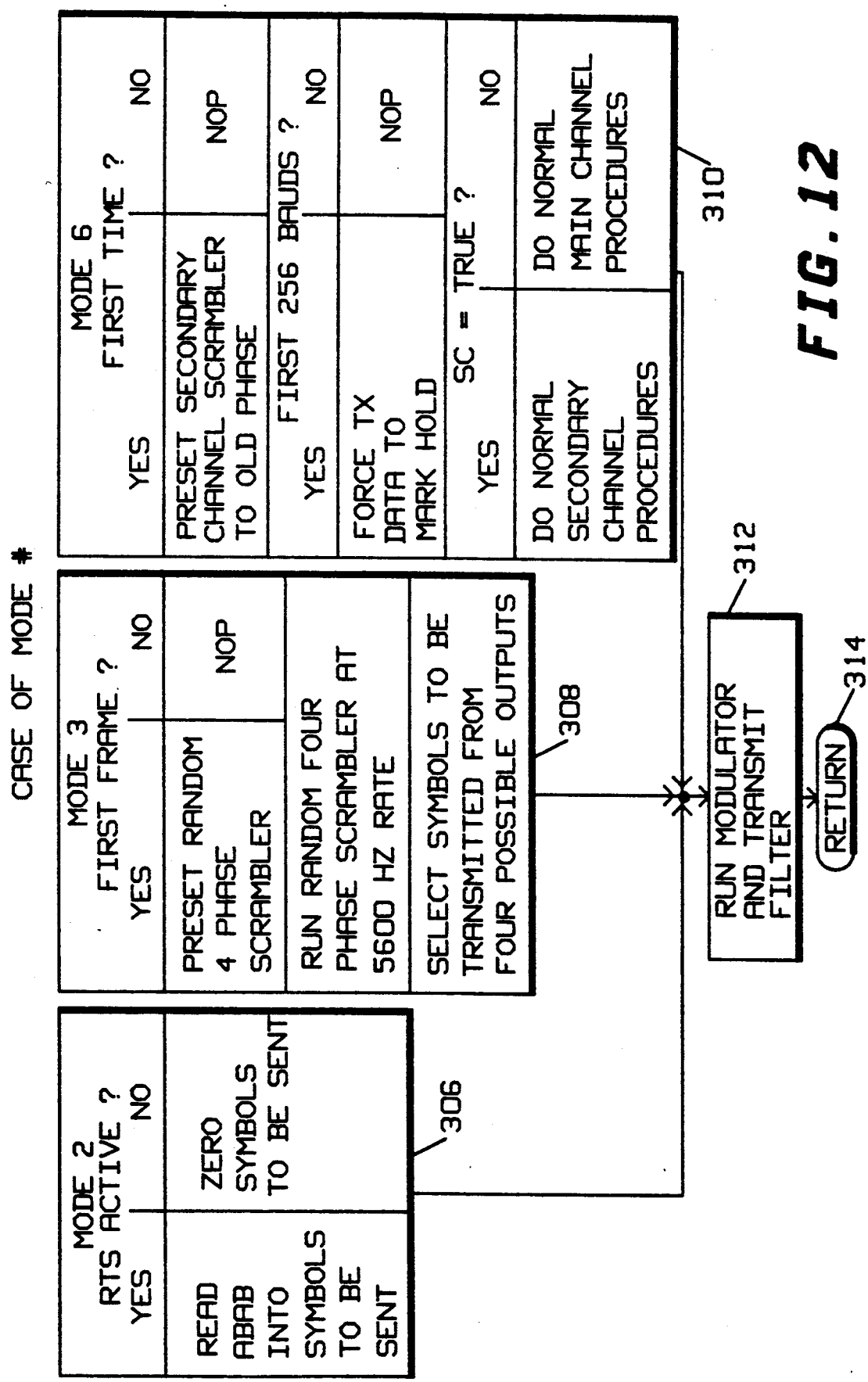
FIG. 12 is a flow chart of the transmitter of the present invention.

The operation of the transmitter of FIG. 6A is described by the flow chart of FIG. 12 which begins with a determination of the case of the mode.

Mode 0 corresponds to the process of initially selecting a baud rate (symbol rate) and carrier frequency. This is accomplished in general by first characterizing the transmission medium and then by selecting optimal carrier frequency and baud rate for communication over the transmission medium. This can be done in a number of ways. For example, consider two wire modems A and B. One technique for selecting baud rate and carrier frequency is as follows:

1. Modem A transmits a tone pattern spanning the communication medium's maximum bandwidth to Modem B. The tone pattern may be either a plurality of tones spanning the bandwidth of the communication medium all transmitted simultaneously, or they may be transmitted one tone at a time. (A random noise signal or an impulse could also be used in a similar method).
2. Simultaneously (or sequentially), Modem B transmits a similar tone pattern spanning the communication medium's bandwidth to Modem A. To avoid interference with one another, the tone patterns may be interleaved in frequency. Modem A can transmit, for example, the following frequencies: 200, 500, 800, 1100, 1400, 1700, 2000, 2300, 2600, 2900, and 3200 Hz; and Modem B can transmit, for example, the following frequencies: 400, 700, 1000, 1300, 1600, 1900, 2200, 2500, 2800, 3100 and 3400 Hz.
3. The receiving modems then analyze the received tone patterns using a Fast Fourier Transform (FFT) in order to characterize the transmission medium in the frequency domain. Probably the most important aspect of this frequency domain characterization is the amplitude distortion introduced by the transmission medium.
4. The amplitude distortion characteristics at these selected frequencies can then used as a pointer to enter a table which determines which carrier frequency and baud rate combination is optimal for the transmission medium. The table entries may be determined empirically by ascertaining which combinations of baud rate and carrier rate are best suited for use of transmission media having various common amplitude distortion curve characteristics. Thresholds can be established for the outputs of the FFT and used for comparison with the actual output of the FFT. A similar technique is described in U.S. Pat. No. 4,797,898 to Aldo Martinez, which is hereby incorporated by reference. For the present modem, there are a small, finite number of suitable carrier frequency and baud rate combinations which can be matched to the FFT output to form a table.
5. Once a particular combination of carrier frequency rate is selected from the table at the receiving modem, the selection is transmitted back to the transmitting modem and mode 0 is complete.

Those skilled in the art will recognize that other methods for selecting baud rate and carrier frequency may also be used without departing from the present invention.

Mode 1 corresponds to an echo canceller training period. This may be carrier out using any conventional echo training technique.

Mode 2 corresponds to the clocks and carriers segment of the training sequence. During this period two vectors are set in on alternating symbol pattern (ABAB ...), for 256 bauds.

Mode 3 corresponds to the equalizer conditioning segment of the training sequence. At the beginning of this segment the scrambler is preset to a value known to the receiver. This scrambler is run at twice the baud rate for a period of 8400 bauds.

Mode 3A occurs at the end of training. The impairment indicators and convergence indicators are analyzed and the maximum data rate that can be supported is selected and signalled to the other adaptive modem. Additionally, the precoding methodology is selected and signalled to the other modem.

Mode 4 - corresponds to a preset for the secondary channel scrambler.

Mode 5 - forces mark hold into customer data.

Mode 4 and mode 5 combined with mode 6 corresponds to the Viterbi synchronization period. During the first frame of this period the initialization for the secondary channel scrambler takes place and the first secondary channel frame is sent. Also the counter that keeps track of primary and secondary channel frames is started. Main channel data is forced to mark hold and the main channel differential and convolutional encoders are started for the first time. This period of the training sequence last for 256 bauds.

Mode 6 corresponds to the steady state. Differential and convolutional encoders for the main channel are being used. Customer data is enabled. Constellation division multiplexing between main channel and secondary channel is enabled.

Figure 2:
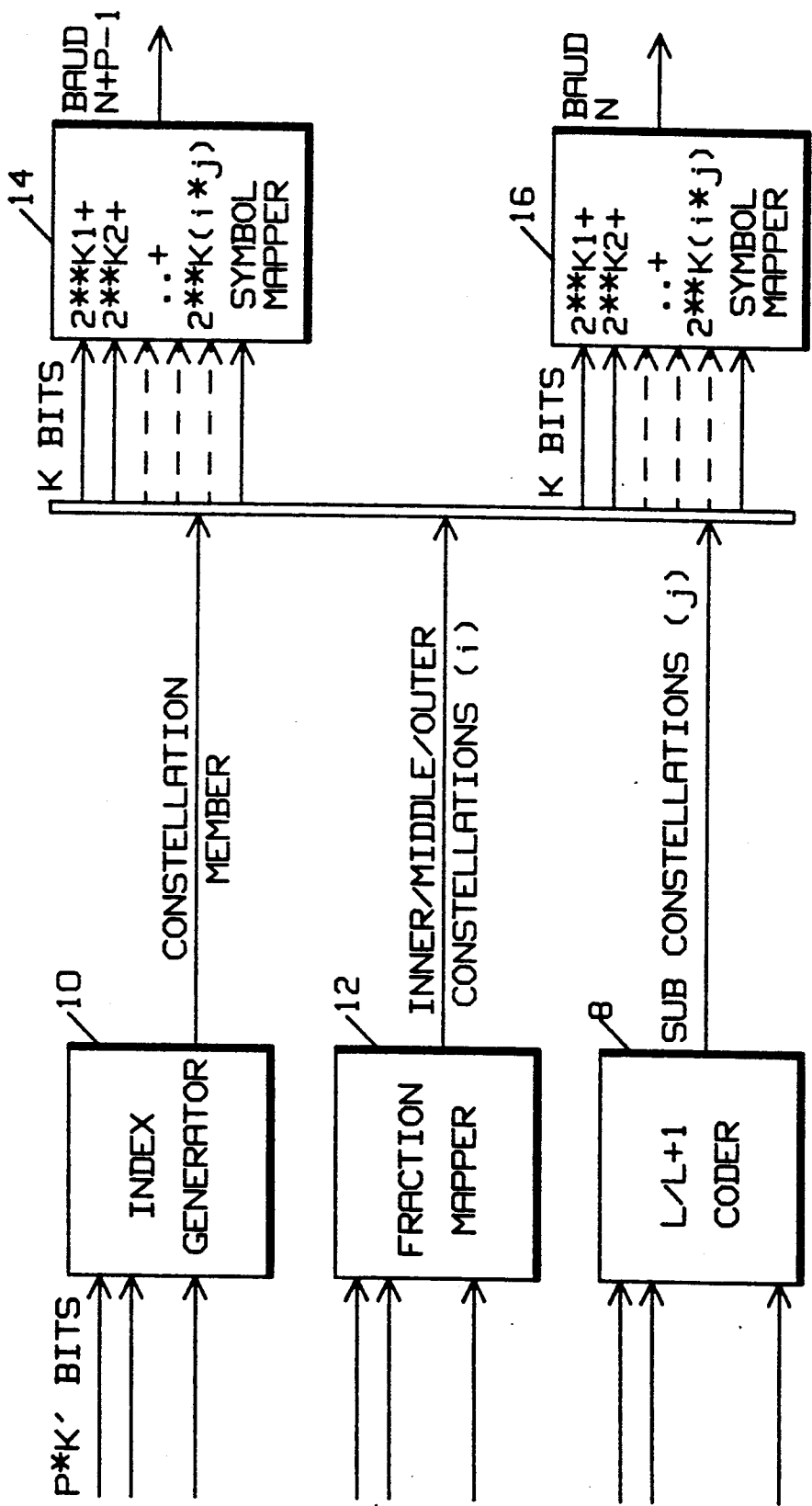
FIG. 2 is block diagram of a convolutional coded transmitter for a binary mapped two m-dimensional system of the prior art.
Figure 3:
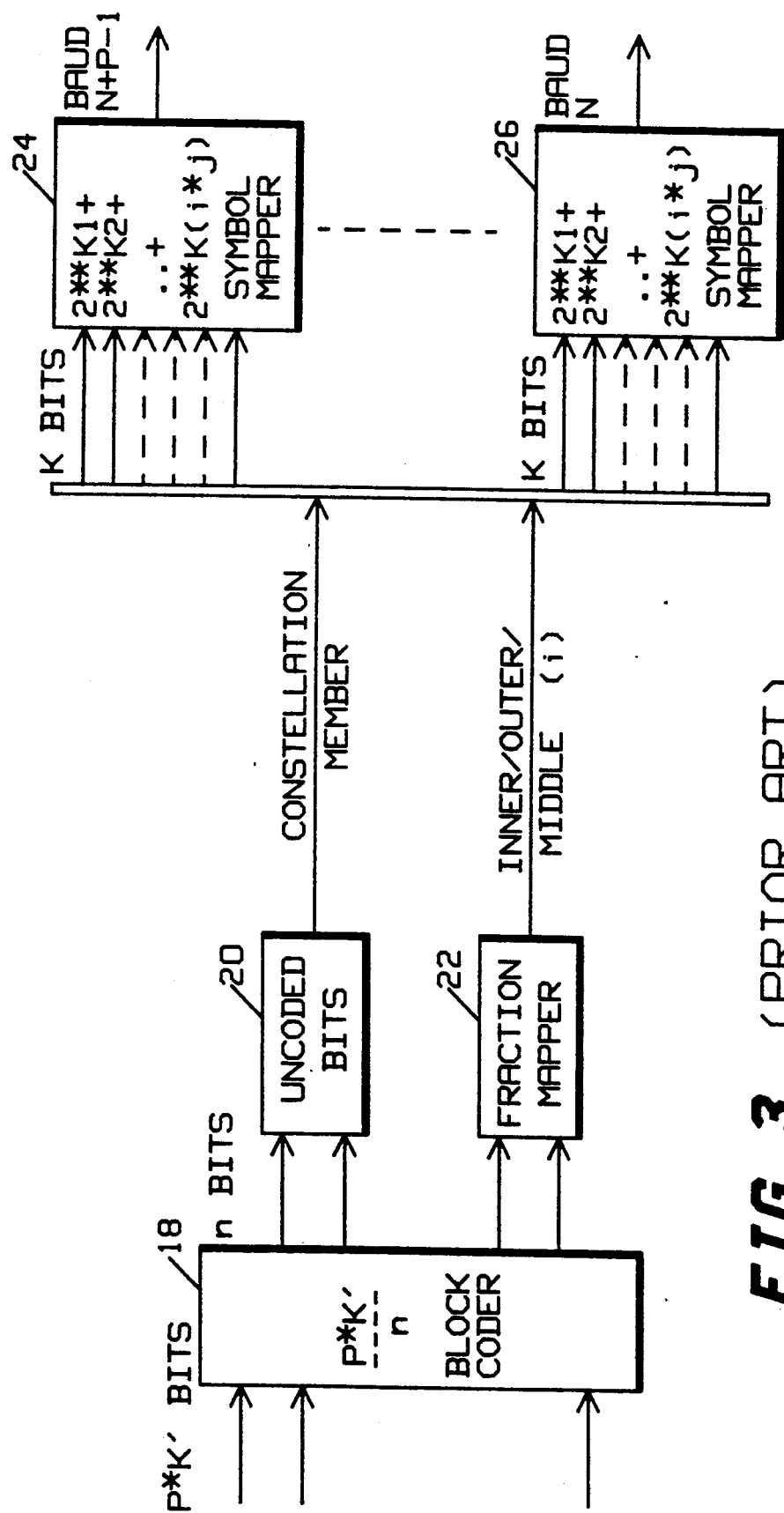
FIG. 3 is a block diagram of a block coded transmitter in a binary mapped two m-dimensional system of the prior art.

In case of mode 2 FIG. 12, block 306 is entered where an ABAB pattern is sent if RTS is active; otherwise zeros are sent (squelch). In case of Mode 3, block 308 is entered. On the first frame the random four phase scrambler is preset. After this, the scrambler is operated at 5600 Hz and one of four possible symbols is selected for transmission. In case of mode 6, the secondary channel scrambler is preset the first time. During the first 256 bauds TX data is forced to mark hold pattern and then normal main or secondary channel operation takes place depending on the value of SC from the timer generator 140 of FIG. 2. After 306, 308, or 310, the modulator and filters 312 routines are executed after which the process returns at 314 to the case decision.

The superframe 50 of FIGS. 7 and 8 are 4×4 and 64×4 bauds long, respectively. With respect to FIG. 8, which is the superframe used with the secondary channel, the first four baud frame within this superframe corresponds to the secondary channel with vectors that have an average energy that is greater than the average energy of the main channel. The remaining 63×4 bauds correspond to the main channel and they have a lower expected average energy. One synchronization scheme uses a sliding window that looks at one 4 baud frame at a time for the expected secondary channel energy and once it finds a close match, it verifies by checking the corresponding subframe that comes in the next superframe. Many other known techniques can also be used. If a good match is found for the energies in that frame, then synchronization has likely been achieved for the receiver, else the sliding window is moved one baud at a time until synchronization is achieved. In multiport modems, properly establishing the order of the multiport subframes within the master frame can be used to assure multiport resynchronization is achieved after a dropout.

Figure 1:
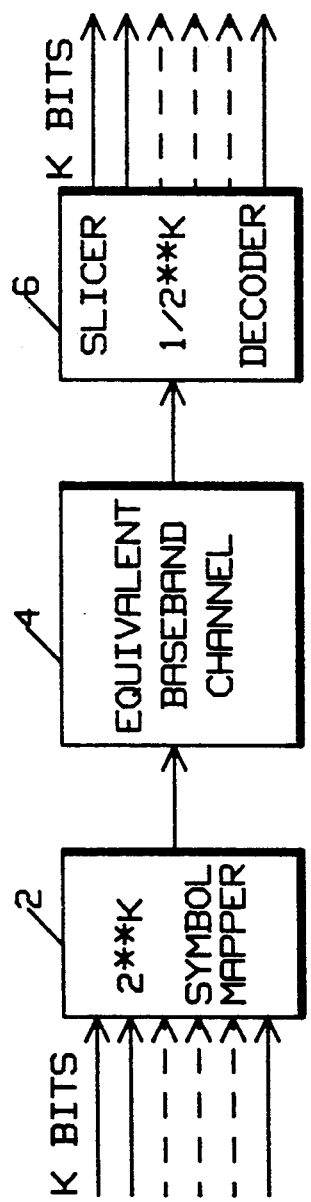
FIG. 1 is a block diagram of a generalized binary mapping system for a communication device of the prior art.
Figure 10:
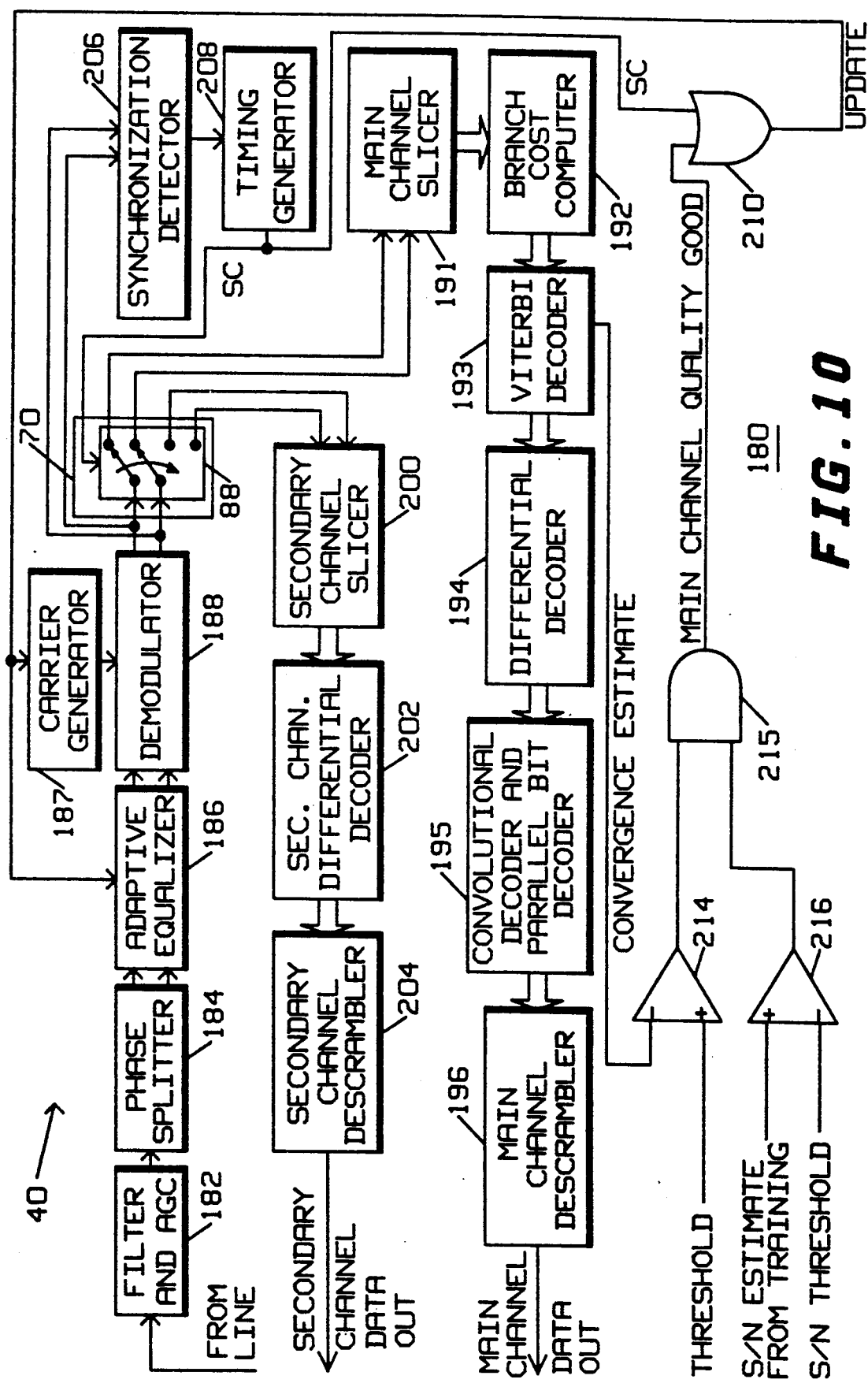
FIG. 10 is a more detailed block diagram of the receiver shown in FIG. 6B for one of the modes of operation of the adaptive modem.
Figure 11:
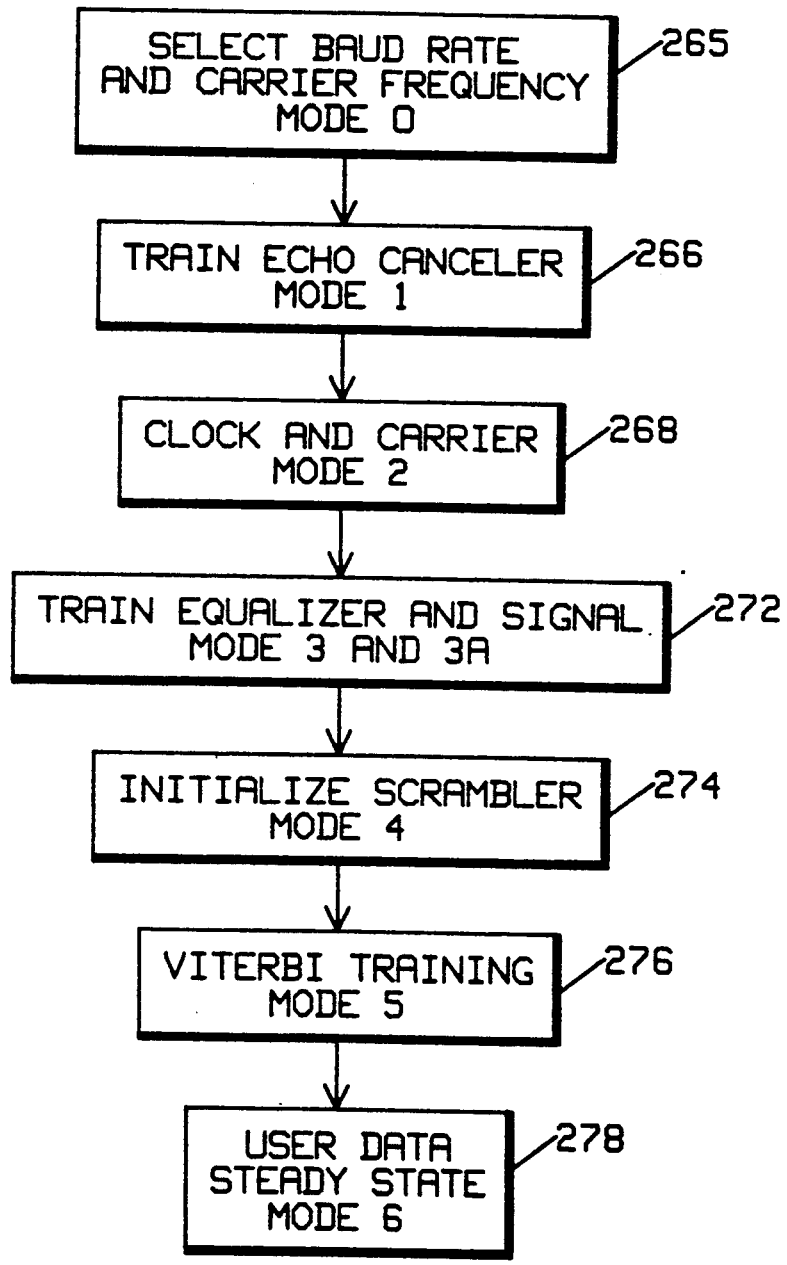
FIG. 11 is a flow chart of the training process of the adaptive modem.

The modem in which the present invention is implemented is a microprocessor based modem. As will be appreciated by those in the art, the microprocessor-based modem control and data processing circuits also typically include the usual data storage elements (e.g., ROM for program control storage and the like, and RAM for variable input/output/intermediate result data, etc.) conventionally associated signals in accordance with a stored program. In the presently preferred exemplary embodiment, these already present microprocessor CPU, ROM and RAM elements are also utilized to preform the functions of the present invention. With the present invention, the modem functions are preferably implemented in high speed digital signal processors such as Texas Instrument's TMS 32020 processors. With respect to FIG. 1, all of the transmitter modem functions therein are preferably, but not necessarily, performed by the digital signal processor. As is well-known, after filtering, a D/A converter and antialiasing filters (not shown) are used. With respect to FIG. 10, all of the receiver modem functions of FIG. 10 are preferably, but not necessarily, performed by the digital signal processor.

The transmitter flow chart previously referred to is hereinafter provided.

```
c    configure:
c       input bit_rate, baud_rate, mode
c       input secondary_flag, secondary_bit
c       input super_frame_cmsm, super_frame_normal
c       input map_method, constellation_type
c       input symbol maps, coder maps
c       read from slot map: for either CMSM or Normal mode
c          coder flag, fraction_method,
integer_bits,low_frame,super
c    initialize:
c       set baud_counter=0
c       frame_counter=super_frame-1
c       call frame_process
c    main_loop
c       if (2wire)then
c          call echo_canceller
c       endif
c       if (secondary_slot) then
c          call secondary_symbol_generator
c       else
c          call main_symbol_generator
c       endif
c       if (precoder)then
c          call sample_generator(50%_stat)
c       else
c          call sample_generator(50%_stat)
c       endif
c       call modulator
c       output transmit_samples
c       increment baud_counter modulo 4
c       if ( baud_counter.eq.0)call frame_process
c       goto main_loop
c    frame_process
```

```
-continued
c       increment frame_counter
c       reset secondary_slot
c       if( frame_counter=super_frame)then
c          set frame_counter=0
c          set odd_flag
c          if (secondary_flag)then
c             set secondary_slot
c             set low counter=low_frame_cmsm (from slot_map)
c             set high_counter=super_frame -1- low_counter
c          else
c             set low_counter=low_frame_normal
c             set high_counter=super_frame - low_counter
c          endif
c       endif
c       return
c    secondary_symbol_generator:
c       input secondary_data (secondary_bit)
c       call secondary_scrambler(secondary_bit, sec_bit_scr)
c
xmit_symbol(baud_counter)=secondary_constellation(sec_bit_scr)
c       return
c    main_symbol_generator:
c
c       if (baud_counter.eq.o)then
c          if (8d_coder)then
c             input main_data(3_in)
c             call main_scrambler(3_in, 3_scr)
c             call conv_coder (3_scr, 4_coded)
c             input main_data(4_in)
c             call main_scrambler(4_in, 4_scr)
c               call main
differential_mapper(4_coded,4_scr,8_diff_bit)
c             do i_baud=0,3
c             set symbol_bit(i_baud)=mod(8_diff_bit,4)
c             8_diff_bit = 8_diff_bit/4
c             enddo
c             level_1=4
c          else
c             do i_baud=0,3
c             set symbol_bit(i_baud)=0
c             enddo
c             level_1=1
c          endif
c
c          if(odd_flag.eq.1)then
c             if(low_counter.gt.0)then
c                frac=low_frac
c                decrement low_counter
c             else
c                frac= high_frac
c                decrement high_counter
c             endif
c          else
c             if(high_counter.gt.0)then
c                frac= high_frac
c                decrement high_counter
c             else
c                frac= high_frac
c                decrement high_counter
c             else
c                frac= low_frac
c                decrement low_counter
c             endif
c          endif
c          flip odd_flag
c          if(low_countereq.0.and.high_counter.eq.0)then
c             set frame_counter= super_frame-1
c          endif
c
c               call main-mapper(frac, integer_bits,
fraction_method)
c
c          endif
c          return
c
c
c    main_mapper:(fraction_flkag,integer_bits,fraction_method)
c
c       if (fraction_method.ge.4)then
c          radix mapper:
```

-continued
```
c       integer_bits=integer_bits - 2
c       do i_baud=o,3
c          input main_data(integer_bits)
c          call main_scrambler(integer_bits, integer_scr)
c       enddo
c       level_2=level_1 * 2**(integer_bits)
c       num_bit=4+fraction_method
c       radix+ fraction_method
c       if (fraction_flag.eq.high_frac)then
c          num_bit= num_bit+1
c          radix = radix+1
c       endif
c       input main_data( num_bit)
c       call main_scrambler( num_bit, num_scr)
c       do i_baud= 0,2
c          num_remimnder=mod(num_scr.radix)
c          set symbol_bit(i_baud)= level_2*
num_reminder+symbol_bit
               (i_baud)
c       endif
c       if ( jfraction method.lt.4)then
c       Binary mapper:
c          index=binary_table+4*fraction_method
c          if (fraction_flag.eq.high_frac) index=index+4
c          do i_baud= 0,3
c             num_bit= integer_bit+index()++
c             input main_data( num_bit)
c             call main_scrambler( num_bit. num_scr)
c             set symbol_bit(i_baud)= level_1 * num_scr +
               symbol_bit(i_baud)
c          enddo
c       endif
c       do i_baud= 0,3
c          x m i t_s y m b o l ( i_b a u d ) =
main_constellation(symbol_bit(i_baud)
c       endo
c       return
c       binary_table:
c       0 0 0 0; 0 0 0 1; 0 1 0 1; 0 1 1 1; 1 1 1 1
c
c       slot_map:
c       fraction_method: 0: binary signalling of 0 and 1/4
c       fraction_method: 1: binary signalling of 1/4 and 1/2
c       fraction_method: 2: binary signalling of 1/2 and 3/4
c       fraction_method: 3: binary signalling of 3/4 and 1
c       fraction_method 0-3 are used for less than 4 bits/baud
mapping
c       fraction_method: 4: radix signalling of 0 and 4
c       fraction_method: 5: radix signalling of 1/4 and 1/2
c       fraction_method: 6: radix signalling of 1/2 and 3/4
c       fraction_method: 7: radix signalling of 3/4 and 1
c       fraction_method 4-7 are used for more than 4 bits/baud
mapping
c       data_rate:
c       modes
c          baud, coded/unc, fraction_method. integer bits,
low_frame_cmsm,
c                coded/unc. fraction_method. integer_bits,
low_frame_normal
c          constellatino points for low_frame, high_frame
c       Mapper_type:   binary    radix
Binomial
c       Bits/baud needed for uncoded:    any   >=2
         >=4
                  8dcoded:   any   >=4   >=6
c          cmsm    normal   # of points in
constellations
c       slot_4800:
c       2400,0,0,2,55    0,0,2,4    4,8
c
c       slot_7200:
c       2
c       2400,1,1,3,51    1,1,3,4    8,16
c       2743,1,3,2,21    1,3,2,2    4,8
c
c       slot_9600:
c       2
c       2400,1,5,2,47    1,5,2,4   16,32    20,24
c       2743,1,3,3,49    1,3,3,4    8,16
c
c       slot_12000:
c       3
```

-continued
```
c       2400,1,5,3,43    1,5,3,4   32,64    40,48
c       2743,1,6,2,14    1,6,2,2   16,32    24,28
c       2954,1,5,2,31    1,5,2,3   16,32    20,24
c
c       slot_14400:
c       3
c       2400,1,5,4,39    1,5,4,4   64,128   80,96    80,96
c       2743,1,6,3,42    1,6,3,4   32,64    48,56
c       2954,1,4,3,12    1,4,3,2   32,64    40,48
c
c       slot_16800:
c       4
c       2400,1,5,5,35    1,5,5,4   128,256
160,192  160,192
c       2743,1,5,4,7     1,4,4,2   64,128   80,96   80,96
c       2954,1,6,3,42    1,7,3,1   32,64    56,64
c       3200,1,6,3,42    1,6,3,4   32,64    48,56
c
c       slot_21600:
c       3
c       2743,1,5,5,35    1,5,5,4   128,256
160,192  160,192
c       2954,1,4,4,56    1,7,4,4   64,128   112,128
        120,128
c       3200,1,5,4,39    1,5,4,4   64,128   80,96   80,96
c
c       slot_21600:
c       3
c       2743,0,7,7,0     0,7,7,2   128,256
224,256  240,256
c       2954,1,6,5,18    1,6,5,4   128,256
192,224  192,240
c       3200,1,4,5,36    128,256  128,260
128,160  128,160
c
c       slot_22400:
c       1
c       3200,1,5,5,36    1,5,5,4   128,256
160,192  160,192
c
c       slot_24000:
c       2
c       3200,0,6,7,33    0,6,7,4   128,256
192,224  192,224
c       3200,1,7,5,33    1,7,5,4   128,256
224,256  240,256
c
c       slot_25600:
c       2
c       3200,0,4,8,31    0,4,8,4   256,512
256,320  256,320
c       3200,1,5,6,31    1,5,6,31  256,512
320,384  320,384
```

Thus it is apparent that in accordance with the present invention, a method that fully satisfies the aims, advantages and objectives is set forth above. While the invention has been described in conjunction specific embodiments, it is evident that may alternatives, modifications and variations will become apparent to those skilled in the art upon consideration of the forgoing description. Accordingly, it is intended that the present invention embrace all such alternatives, modifications and variation as fall within the spirit and broad scope of the appended claims.

What is claimed is:

1. In a communication device including symbol mapping means for selecting, based upon a plurality of data bits, a plurality of selected symbols for a plurality of symbol intervals; and transmitting means for transmitting during each of said symbol intervals one of said selected symbols, wherein said symbol mapper comprises:

means, in response to receipt of said plurality of data bits, for grouping said data bits into a plurality of received groups of said data bits, there being one of said received groups for each one of a plurality of mapping periods, each of said mapping periods including an integer number p of said symbol intervals and each of said received groups including an integer number of said data bits, said integer number of said data bits being equal to R*p, where said term R is an average number of said data bits per each of said symbol intervals of a given one of said mapping periods and is a non-integer number; each of said received groups being one of Q unique data groups, where said number Q is equal to $2^{R*p}$;

means for correlating one of a plurality of unique combinations of a number of said selected symbols with each of said unique data groups; said plurality of unique combinations being equal to a number U and said number of selected symbols being equal to said integer number p; each of said selected symbols of a given one of said unique combinations being selected from an alphabet of a number of possible symbols, said number of possible symbols being equal to an integer number M, where said integer number M has different values in at least two of said symbol intervals of a given one of said mapping periods and is defined according to the following equation:

$$U = \prod_{c=1}^{p} M_c \geq Q = 2^{R*p}$$

said transmitting means being operable for transmitting one of said unique combinations of said selected symbols for each of said received groups of said data bits.

2. In the communication device according to claim 1, wherein said possible symbols of said alphabet comprise two-dimensional symbols and each of said unique combinations of said symbols defines a 2p-dimensional symbol.

3. In a communication device for transmission of data bits over a transmission medium, comprising:

means for receiving a received group of R*p said data bits for a mapping period of p symbol intervals, where said term R is the average number of said data bits per each of said symbol intervals of said mapping period and is a non-integer number and where said received group is one of Q possible unique groups of said data bits and said number Q is equal to $2^{R*p}$;

means for selecting for each said symbol interval of said mapping period a selected symbol from an alphabet of M possible symbols so as to define one of U unique combinations of p said selected symbols for at least each one of said Q unique groups of R*p data bits, where said term M has different values in at least two of said symbol intervals of a given one of said mapping periods and is defined according to the following equation:

$$U = \prod_{c=1}^{p} M_c \geq Q = 2^{R*p}$$

and;

means for transmitting one of said selected symbols during each of said symbol intervals.

4. In the communication device according to claim 3, wherein each of said possible symbols comprises a two-dimensional symbol; and said unique combination of p said symbols defines a 2p-dimensional symbol.

5. In the communications device according to claim 3, wherein said R*p is equal to an integer number.

6. In the method for transmitting a plurality of data bits over a transmission medium, said method including the steps of selecting a symbol from a constellation of symbols for each of a plurality of symbol intervals based upon the plurality of data bits and transmitting during each of the symbol intervals the symbol selected for the symbol interval, the improvement comprising the steps of:

forming a group of R*p said data bits for a mapping period of p said symbol intervals, where said R is an average number of said data bits per said symbol intervals for said mapping period and R*p is equal substantially to an integer number; and transmitting a unique combination of p said symbols for said group of R*p data bits, where each of said p symbols are selected from said symbol constellation having M said symbols, where said term M is a mathematical variable having different values in at least two of said symbol intervals of a given one of said mapping periods and is defined according to the following equation:

$$U = \prod_{c=1}^{p} M_c \geq Q = 2^{R*p}$$

wherein said term Q defines a number of possible unique groups of R*p data bits, said term U defines a number of possible unique combinations of said selected symbols.

7. In the method according to claim 6, wherein said plurality of symbols comprise a plurality of two-dimensional symbols; and said unique combination of p said symbols defines a 2p-dimensional symbol.

* * * * *